US011140436B2

(12) United States Patent
Wang et al.

(10) Patent No.: US 11,140,436 B2
(45) Date of Patent: Oct. 5, 2021

(54) INFORMATION PROCESSING METHOD AND TERMINAL

(71) Applicant: Tencent Technology (Shenzhen) Company Limited, Shenzhen (CN)

(72) Inventors: Qianyi Wang, Shenzhen (CN); Yanggang Dai, Shenzhen (CN); Lei Ying, Shenzhen (CN); Faqiang Wu, Shenzhen (CN); Lingrui Cui, Shenzhen (CN); Zhenhai Wu, Shenzhen (CN); Yu Gao, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 39 days.

(21) Appl. No.: 15/962,663

(22) Filed: Apr. 25, 2018

(65) Prior Publication Data

US 2018/0249200 A1 Aug. 30, 2018

Related U.S. Application Data

(63) Continuation of application No. PCT/CN2017/076576, filed on Mar. 14, 2017.

(30) Foreign Application Priority Data

Mar. 14, 2016 (CN) .......................... 201610143985.2

(51) Int. Cl.
*H04N 21/442* (2011.01)
*H04N 21/433* (2011.01)
(Continued)

(52) U.S. Cl.
CPC ..... *H04N 21/4334* (2013.01); *G06K 9/00302* (2013.01); *H04N 5/23216* (2013.01);
(Continued)

(58) Field of Classification Search
CPC ................................................ H04N 21/44218
See application file for complete search history.

(56) References Cited

U.S. PATENT DOCUMENTS

| 2007/0260984 A1* | 11/2007 | Marks | ..................... A63F 13/79 |
| | | | 715/706 |
| 2014/0111542 A1* | 4/2014 | Wan | ..................... G06K 9/3258 |
| | | | 345/633 |

(Continued)

FOREIGN PATENT DOCUMENTS

| CN | 1870744 A | 11/2006 |
| CN | 101453573 A | 6/2009 |

(Continued)

OTHER PUBLICATIONS

International Search Report for PCT/CN2017/076576, dated Jun. 1, 2017, 5pgs—with English translation.

(Continued)

*Primary Examiner* — Michael H Hong
(74) *Attorney, Agent, or Firm* — Oblon, McClelland, Maier & Neustadt, L.L.P.

(57) ABSTRACT

A method of performing video synthesis by a terminal is described. Circuitry of the terminal receives a first operation to trigger capture of first media information and detects at least one of a facial expression change of a user based on a first preset condition or a gesture of the user based on a second preset condition during the capture of the first media information. The circuitry of the terminal sends the detected at least one of the facial expression change or the gesture of the user to a server as key information. The circuitry of the terminal receives second media information that corresponds to the key information from the server and performs video synthesis on the first media information and the second media information.

20 Claims, 14 Drawing Sheets

(51) Int. Cl.
*G06K 9/00* (2006.01)
*H04N 5/76* (2006.01)
*H04N 21/414* (2011.01)
*H04N 21/4788* (2011.01)
*H04N 21/44* (2011.01)
*H04N 21/4223* (2011.01)
*H04N 5/232* (2006.01)

(52) U.S. Cl.
CPC ........... *H04N 5/23219* (2013.01); *H04N 5/76* (2013.01); *H04N 21/41407* (2013.01); *H04N 21/4223* (2013.01); *H04N 21/44008* (2013.01); *H04N 21/4788* (2013.01); *H04N 21/44016* (2013.01); *H04N 21/44218* (2013.01)

(56) References Cited

U.S. PATENT DOCUMENTS

| | | | | |
|---|---|---|---|---|
| 2014/0376785 | A1* | 12/2014 | Bathiche | G06T 5/001 382/118 |
| 2016/0196584 | A1* | 7/2016 | Franklin | G06F 3/04845 705/14.64 |
| 2017/0186230 | A1* | 6/2017 | Ivers | G06F 3/011 |

FOREIGN PATENT DOCUMENTS

| | | | |
|---|---|---|---|
| CN | 102427553 | A | 4/2012 |
| CN | 105791692 | A | 7/2016 |
| JP | 2006-211120 | A | 8/2006 |
| JP | 2006-311328 | A | 11/2006 |
| JP | 2009-077380 | A | 4/2009 |
| JP | 2010-066844 | A | 3/2010 |
| JP | 2010066844 | A | 3/2010 |
| JP | 2010-246085 | A | 10/2010 |
| JP | 2013-046358 | A | 3/2013 |
| TW | 201021550 | A | 6/2010 |

OTHER PUBLICATIONS

Chinese Office Action for CN201610143985.2, dated Feb. 26, 2019. English translation provided.
International Preliminary Report on Patentability for PCT/CN2017/076576, dated Sep. 18, 2018. Partial English translation provided.
Written Opinion of the ISA for PCT/CN2017/076576, dated Jun. 1, 2017. English translation provided.
Japanese Office Action for JP2018-527883, dated Jun. 4, 2019. English translation provided.

* cited by examiner

INFORMATION PROCESSING METHOD AND TERMINAL

RELATED APPLICATION

This application is a continuation of International Application No. PCT/CN2017/076576, filed on Mar. 14, 2017, which claims priority to Chinese Patent Application No. 201610143985.2, filed with the Chinese Patent Office on Mar. 14, 2016 and entitled "INFORMATION PROCESSING METHOD AND TERMINAL." The entire disclosures of the prior applications are hereby incorporated by reference in their entirety.

FIELD OF THE TECHNOLOGY

This application relates to communications technologies, and in particular, to an information processing method and a terminal.

BACKGROUND OF THE DISCLOSURE

A commonly seen information processing solution is that a user records a video and shares the recorded video by using an application in a terminal such as a mobile phone. Other information correlated or non-correlated to video content may further be added to the recorded video, so that a synthetic video is obtained.

To obtain the synthetic video, an operation of adding other information needs to be performed, which is very complex and requires the user to choose additional information from a material library. For example, the user needs to choose information correlated to video information in the video content from the material library. Even if the chosen information meets a correlation requirement, factors such as at which location and time point the information is to be added to the video content need to be further considered. Such an interaction mode is very complex and requires interaction for many times, which leads to low processing efficiency. Besides, due to repeated interaction, the time costs of processing are very high. For example, a finally obtained effect of the synthetic video may be barely satisfactory and does not meet an actual user's requirement, so the user may perform synthesis once again. As such, the information processing costs of performing video synthesis by using a terminal continue to increase. However, there is no effective solution to this problem in related technologies.

SUMMARY

In view of this, embodiments of this application provide an information processing method and a terminal, at least to resolve the problem that exists in the related technology.

In one embodiment of the present disclosure, there is provided an information processing method. In the method a first operation to trigger capture of first media information is received by circuitry of a terminal. At least one of a facial expression change of a user is detected based on a first preset condition or a gesture of the user is detected based on a second preset condition during the capture of the first media information. The detected at least one of the facial expression change or the gesture of the user is sent to a server as key information by the circuitry of the terminal. Second media information that corresponds to the key information is received from the server by the circuitry of the terminal. Video synthesis is performed on the first media information and the second media information.

In another embodiment of the present disclosure, there is provided a terminal, including circuitry. The circuitry is configured to receive a first operation to trigger capture of first media information and detect at least one of a facial expression change of a user based on a first preset condition or a gesture of the user based on a second preset condition during the capture of the first media information. The circuitry is configured to send the detected at least one of the facial expression change or the gesture of the user to a server as key information and receive second media information that corresponds to the key information from the server. The circuitry is further configured to perform video synthesis on the first media information and the second media information.

In another embodiment of the present disclosure, there is provided a non-transitory computer-readable medium storing a program executable by a processor to perform an information processing method. In the method a first operation to trigger capture of first media information is received and at least one of a facial expression change of a user is detected based on a first preset condition or a gesture of the user is detected based on a second preset condition during the capture of the first media information. The detected at least one of the facial expression change or the gesture of the user is sent to a server as key information. Second media information that corresponds to the key information is received from the server. Further, video synthesis is performed on the first media information and the second media information.

By means of the embodiments of this application, when at least one of a facial expression change of a user or a gesture of the user is detected during real-time capture of the first media information, the corresponding second media information is obtained from the server based on the at least one of the facial expression change or the gesture of the user, and video synthesis is performed on the first media information and the second media information according to the preset configuration, so that after the capture of the first media information ends, a synthetic video is replayed. In the synthetic video, the corresponding second media information is displayed at a specified location and specified time of the first media information. The user does not need to manually choose and add the second media information, so that an operation procedure is simplified and the processing efficiency is improved; and the corresponding second media information obtained by performing requesting according to a detection result (for example, the facial expression change or the gesture of the user) that is obtained during the capture of the first media information also better meets an actual user's requirement. By means of the foregoing method, specific advantages can be achieved. First, content of the second media information is relatively precise. Second, a location and time at which the second media information occurs can also match the detection result such as the facial expression change or the gesture of the user. Therefore, the location and the time point are also precise. Not only interaction for many times is reduced, but also re-adjustment and re-synthesis do not need to be performed subsequently, thereby reducing the information processing costs and the time costs of video synthesis.

DESCRIPTION OF EMBODIMENTS

Implementation of the technical solutions is further described in detail below with reference to the accompanying drawings.

Figure 1:
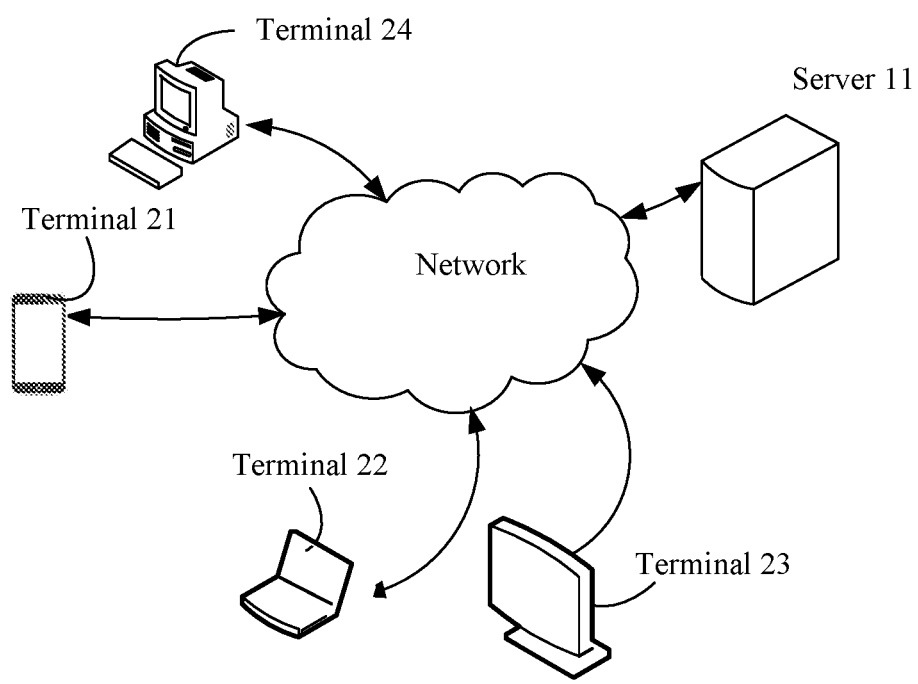
FIG. 1 is a schematic diagram of hardware entities of all parties that perform information interaction according to embodiments of this application.

FIG. 1 is a schematic diagram of hardware entities of all parties that perform information interaction according to embodiments of this application. In FIG. 1, a server 11 and terminal devices 21, 22, 23, and 24 are included. The terminal devices 21, 22, 23, and 24 exchange information with the server by using a wired network or a wireless network. The terminal device may include a mobile phone, a desktop computer, a personal computer (PC), an all-in-one machine, and the like. A plurality of applications that satisfies daily requirements and working requirements of a user is installed in the terminal device. If the user likes taking pictures and recording videos, the user may install applications such as a picture processing application and a video processing application in the terminal device; and may also install a social application out of a requirement on social networking and sharing. In addition, information of a processing result obtained by using the picture processing application and the video processing application may be shared by using the social application. By using the embodiments of this application, based on the system shown in FIG. 1, the terminal device periodically obtains an update data packet of each application from the server and locally stores the update data packet. When the terminal device needs to use an application therein, the terminal device enables the application (such as the video processing application), and obtains a first operation, for example, an operation of enabling to record a video, thereby triggering, for example, collection (or capture) of first media information of the video. The terminal device detects at least one of a facial expression change of a user based on a first preset condition or a gesture of the user (user action) based on a second preset condition in a capture area during the capture of the first media information. The terminal device then sends the at least one of the facial expression change of the user or the gesture of the user to the server as key information. For example, the facial expression change may be a smile, and the gesture of the user may be blinking eyes or gesturing a V sign. The terminal receives second media information such as a sticker, which corresponds to the key information, from the server; and performs video synthesis on the first media information and the second media information. By means of the embodiments of this application, when at least one of an facial expression change or a gesture of the user is detected during real-time capture of the first media information, the corresponding second media information is obtained from the server based on the at least one of the facial expression change of the user or the gesture of the user, and video synthesis is performed on the first media information and the second media information, so that after the capture of the first media information, a synthetic video is replayed. In the synthetic video, the corresponding second media information is displayed at a specified location and specified time. The user does not need to manually choose and add the second media information, so that an operation procedure is simplified and the processing efficiency is improved; and the corresponding second media information obtained by performing requesting according to a detection result (for example, the facial expression change or the gesture of the user) that is obtained during the capture of the first media information also better meets an actual user's requirement. By means of the foregoing method, specific advantages can be achieved. First, content of the second media information is relatively precise. Second, a location and time at which the second media information occurs can also match the detection result such as the facial expression change or the gesture of the user. Therefore, the location and the time point are also precise. Not only interaction for many times is reduced, but also re-adjustment and re-synthesis do not need to be performed subsequently, thereby reducing the information processing costs and the time costs of video synthesis.

The foregoing example of FIG. 1 is only an example of a systematic architecture for implementing the embodiments of this application, and the embodiments of this application are not limited to the systematic structure described in FIG. 1. All embodiments of this application are provided based on the systematic architecture.

Embodiment 1

Figure 2:
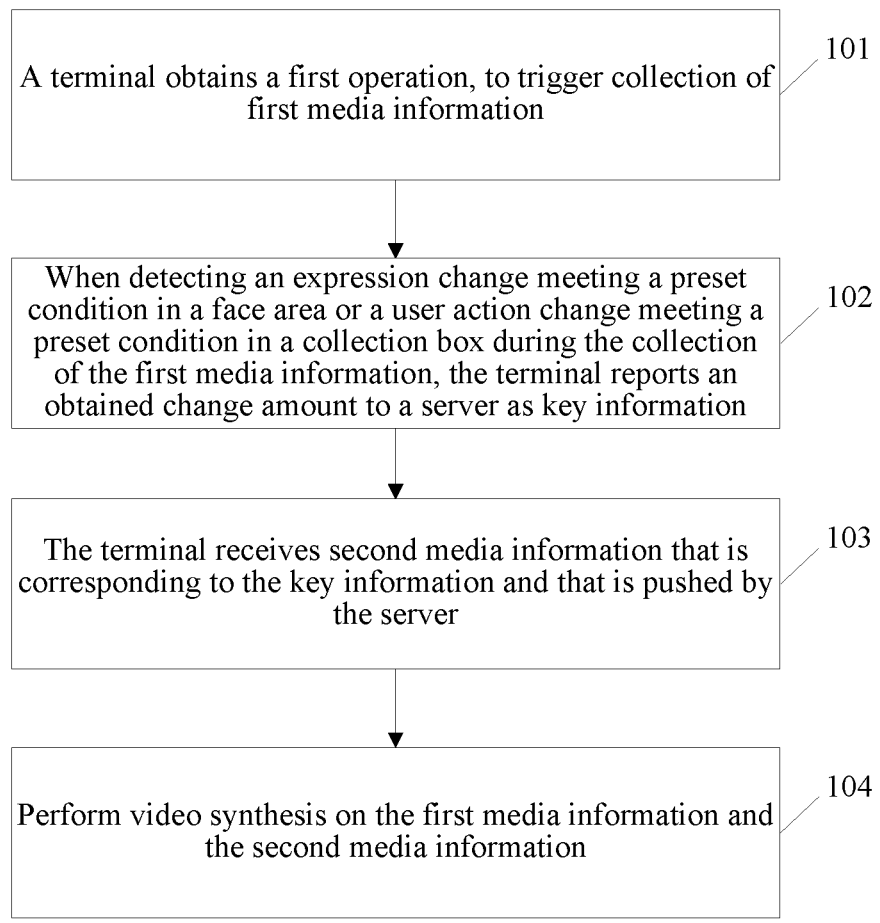
FIG. 2 is a schematic diagram of an implementation procedure according to Embodiment 1 of this application.

An information processing method according to this embodiment of this application is shown in FIG. 2. The method includes:

In step 101, a terminal obtains a first operation to trigger collection (or capture) of first media information. For example, the terminal receives a first operation to trigger capture of first media information.

Figure 3:
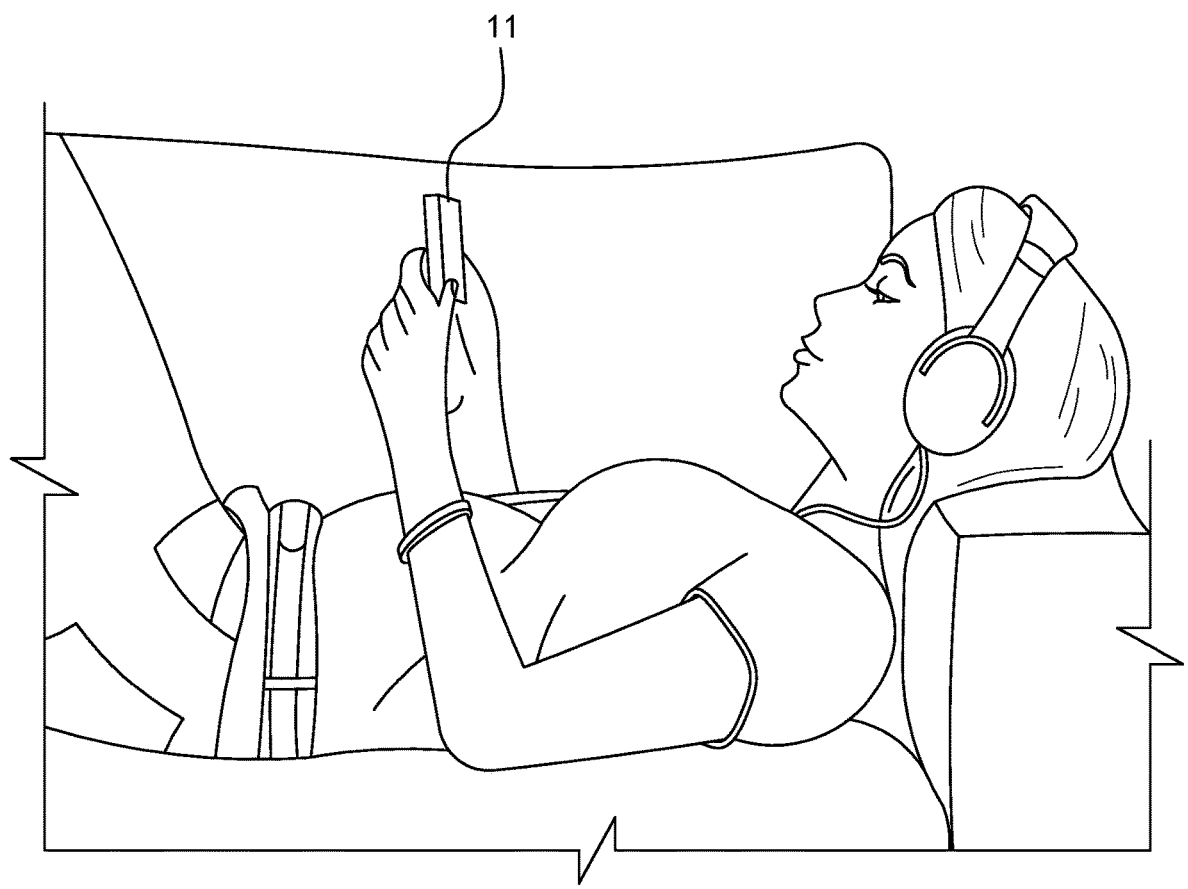
FIG. 3 is a schematic diagram of an application scenario to which an embodiment of this application is applied.
Figure 4:
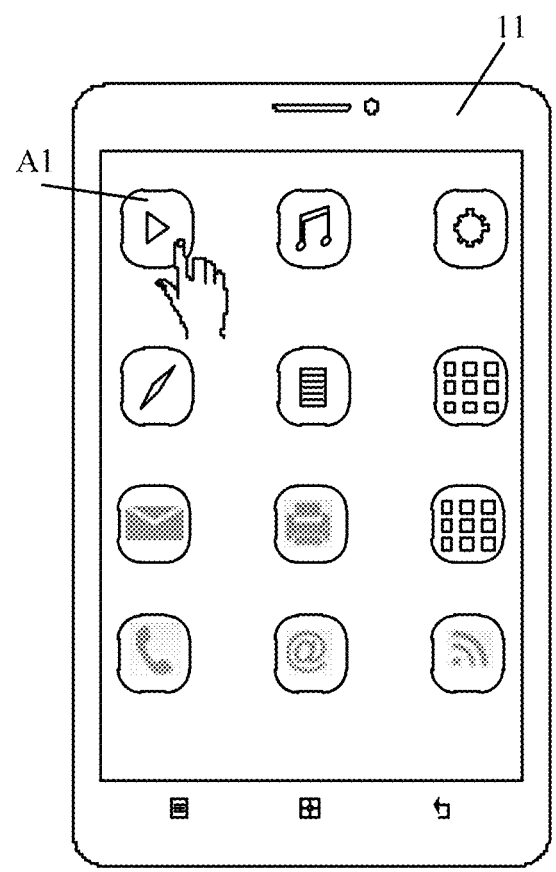
FIG. 4 is a schematic diagram of triggering video recording to which an embodiment of this application is applied.

In an application scenario, as shown in FIG. 3, a user lain on a couch is using a terminal device such as a mobile phone 11. A user interface of the mobile phone 11 is shown in FIG. 4, which includes various types of application icons, for example, a music playback icon, a function setting icon, and an email receiving and sending icon. The user performs the first operation, for example, taps a video processing application icon marked by A1 with a finger, and enters a processing process of video recording, to trigger, for example, the collection of the first media information. For example, the user may record a video while indoors or perform selfie or the like.

In step 102, when detecting an expression change (or facial expression change) meeting a preset condition in a face area or a user action change (or gesture) meeting a preset condition in a collection box during the collection of the first media information, the terminal reports an obtained change amount to a server as key information. For example, detecting at least one of a facial expression change of a user based on a first preset condition or a gesture of the user based on a second preset condition during the capture of the first media information, and sending the detected at least one of the facial expression change or the gesture of the user to a server as key information.

Herein, still with reference to the application scenario in step 101, in the processing process of video recording, the terminal may capture an expression change (or facial expression change), such as a smile, a cry, or a frown, in the face area by using a facial recognition and positioning mechanism and an expression recognition mechanism. In addition, the terminal device may alternatively detect the user action change (or gesture of a user), such as gesturing a V sign, in the collection box (or capture area or referred to as a framing area). Such detection is not limited to being performed in the face area. Combined recognition may further be performed on the expression change and the user action change in the face area. For example, combined recognition is performed on a combination of a V sign and a smile of facial expressions.

The facial recognition technology is to collect, based on facial features of a person, a face image or a video stream during video recording. During facial recognition, first, whether there is a face in the video stream is determined. If there is a face, the location and the size of the face are further provided, and the location information of each main facial organ is positioned, so that the respective locations and initial forms of five sense organs on the face are obtained. When the forms change, for example, when a person smiles, the locations of his upper and lower lips will generate displacement and a form change relative to the initial forms, and it indicates that facial expressions of the five sense organs on the face change. Changes in expressions may also be recognized by using the expression recognition mechanism. The facial recognition in this embodiment of this application is different from the related facial recognition. The related facial recognition is to recognize a user identity by constructing a facial recognition system, and compare the recognized face with a known face, so as to facilitate identity confirmation and identity searching.

An expression recognition process may include four phases: face image obtaining and pre-processing; face detection; expression feature extraction; and expression classification. If only the facial recognition and positioning mechanism is used, there may be a problem of imprecision. However, the expression recognition mechanism is a more accurate processing policy. Expression recognition is closely correlated to facial recognition. For example, positioning during face detection is similar to that in such links as face tracking, but a difference lies in feature extraction. For example, during facial recognition extraction, attention is mainly paid to individual differences and features of different faces, and a facial expression exists as an interference signal. Therefore, not too much attention is paid to the facial expression during facial recognition. However, in this embodiment of this application, attention needs to be paid to changes in expressions, to trigger corresponding second media information, and therefore, the individual differences may be neglected, but attention is paid to feature extraction of differential features of the faces in different expression modes. The expression recognition may be combined with the individual differences, or the individual differences may be processed as an interference signal to improve the expression recognition precision, that is, not too much attention is paid to the individual differences. Feature extraction is a core step during face expression recognition because it determines a final recognition result and affects the value of the recognition rate. The feature extraction may include static image feature extraction and moving image feature extraction. In terms of the static image feature extraction, form change features of an expression (or referred to as transient features of an expression) are extracted. In terms of the moving image feature extraction, not only form change features of an expression in each frame need to be extracted for a moving image, but also motion features of consecutive sequences need to be extracted. Extraction of the form change features may depend on a neutral expression or a model, so that a generated expression is compared with the neutral expression to extract the form change features. However, extraction of the moving features directly depends on a facial change generated by an expression. Expressions have various classification manners. For example, expressions are classified into: 1) happiness, sadness, surprise, fear, anger, disgust, and the like according to basic expressions, to set up different facial expression image libraries for subsequent matching and recognition; 2) joy, sadness, excitement, calmness, anxiety, relief, and the like according to emotions.

In step 103, the terminal receives second media information that is corresponding to the key information and that is pushed by the server. For example, the terminal receives second media information that corresponds to the key information from the server.

A specific implementation of this step may be: After step 102 of sending the key information to the server, the server finds the corresponding second media information, such as sticker information, from a material library by means of matching according to the key information, and pushes the second media information to the terminal, so that video synthesis is to be performed subsequently on the first media information and the second media information in step 104. The user does not need to manually choose the sticker information, but the sticker information is automatically pushed to the terminal after matching is performed according to the key information. During the capture of the first media information (for example, a video), the terminal automatically synthesizes (for example, superposes the video and the sticker information) a video processing result, and displays the sticker information at a specified location and specified time of the first media information (for example, the video).

In step 104, perform video synthesis on the first media information and the second media information.

In an implementation of this embodiment of this application, the key information further includes text information in the first media information.

The information processing method further includes: detecting the text information during the capture of the first media information, and sending the detected text information to the server as the key information.

Figure 5:
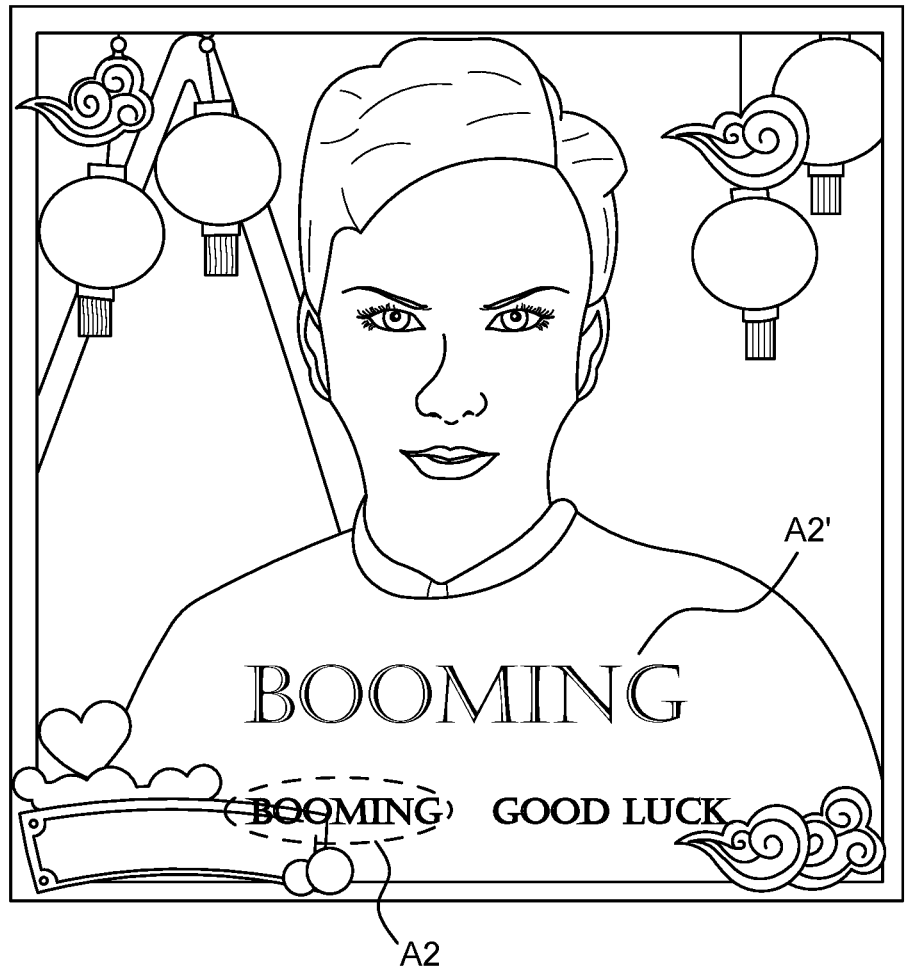
FIG. 5 to FIG. 6 are schematic diagrams of a plurality of scenarios in which the related technology is used.

In the related technology, the video information shown in FIG. 5 specifically includes text information "Booming" marked by A2. After recording of the video information ends, sticker information "Booming" marked by A2' is added. The sticker information is manually chosen from the material library of the server by means of interaction between the terminal and the server for many times. Subsequently, the sticker information is added to the video information that has been recorded.

Figure 6:
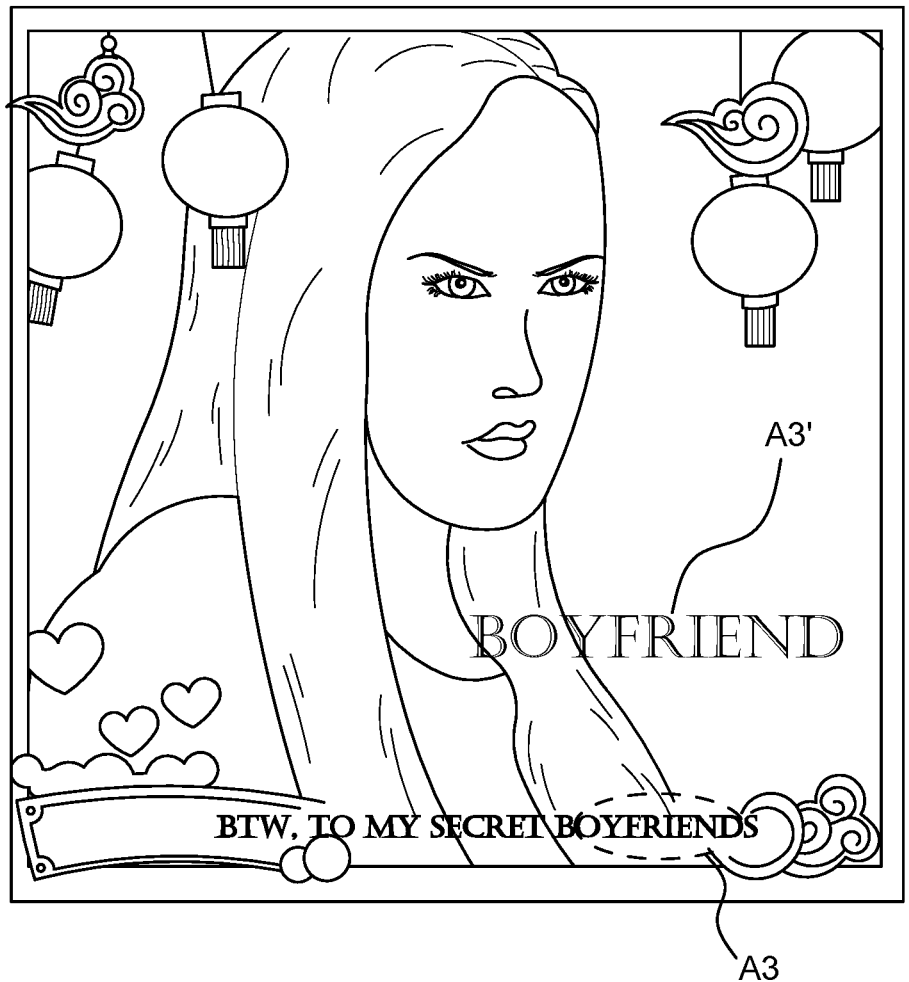

FIG. 6 shows another application scenario of the related technology. Specifically, the video information includes text information "Boyfriend" marked by A3. After recording of the video information ends, sticker information "Boyfriend" marked by A3' is added. The sticker information is manually chosen from the material library of the server by means of interaction between the terminal and the server for many times. Subsequently, the sticker information is added to the video information that has been recorded. Such processing is very complex and needs user interaction for many times, and the user may not truly need the sticker that is subsequently found. Even if the user truly needs the sticker, the user needs to manually add the sticker to the video information that has been recorded, for example, move the sticker to an appropriate location in the video information.

Figure 7:
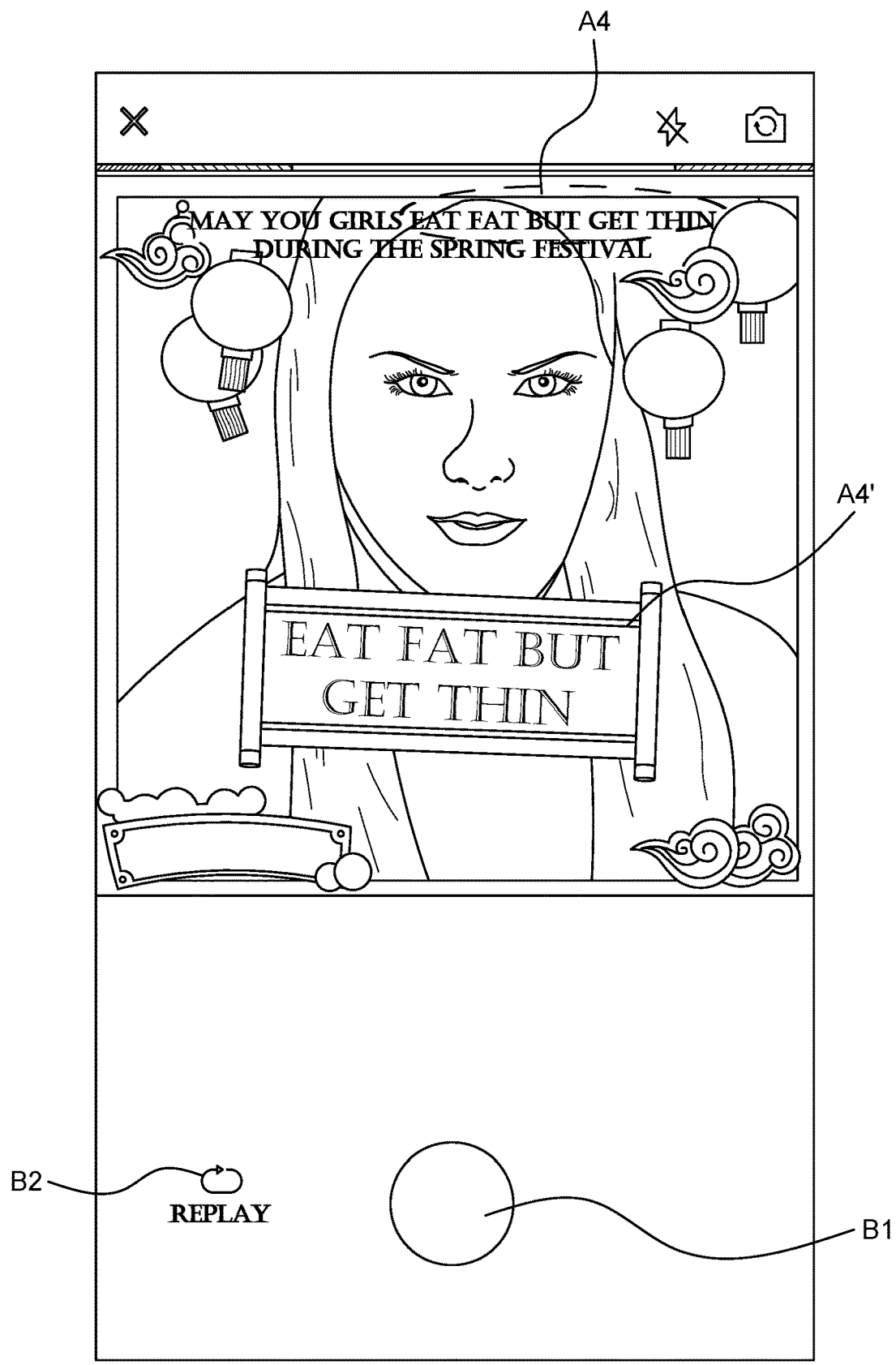
FIG. 7 to FIG. 12 are schematic diagrams of a plurality of scenarios to which the embodiments of this application is applied.
Figure 8:
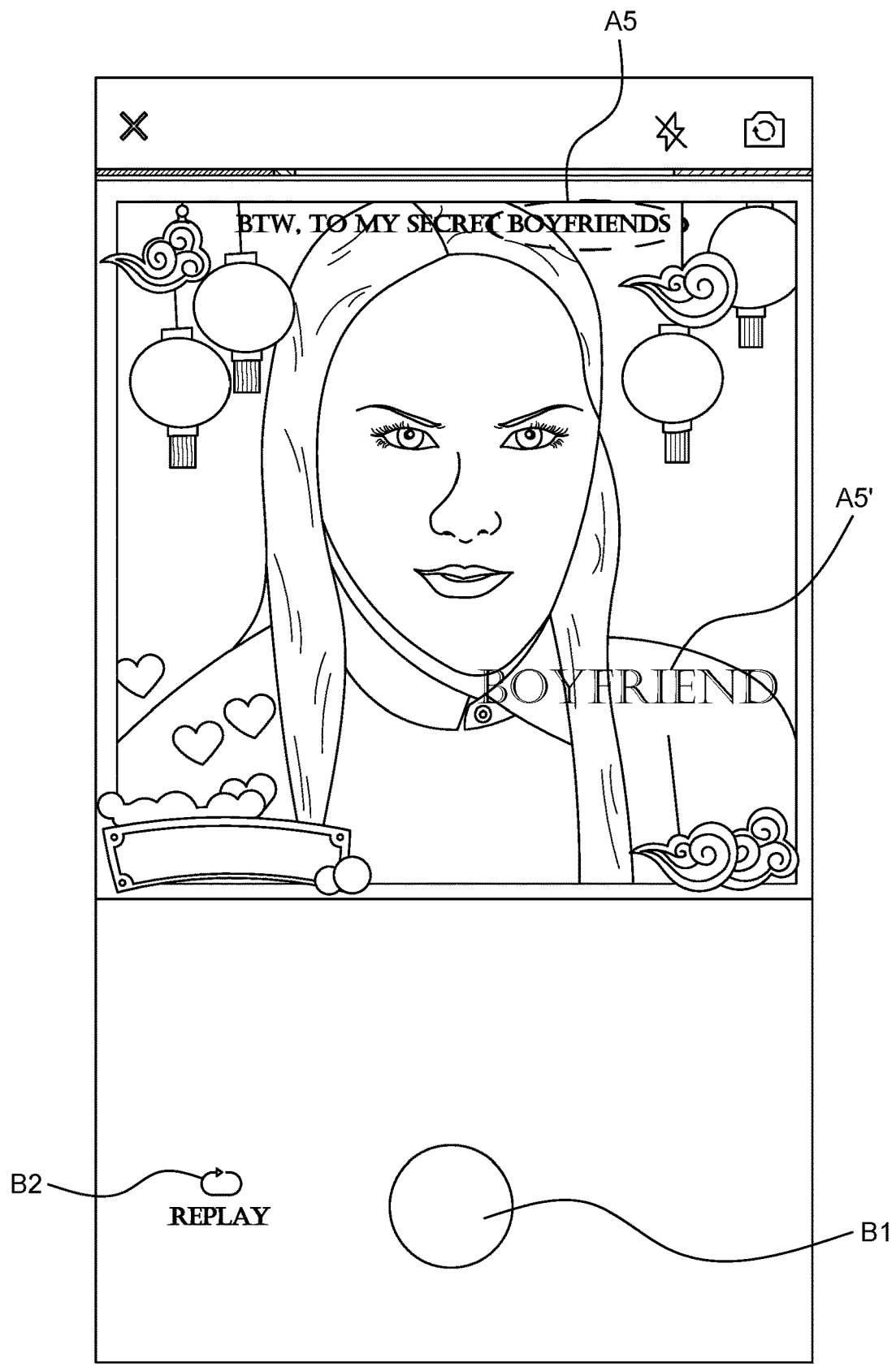

By means of this embodiment of this application, a video shown in FIG. 7 includes text information "Eat fat but get thin" marked by A4, and the text information is sent to the server as the key information. Matched sticker information obtained based on the key information is marked by A4'. A video shown in FIG. 8 includes text information "Boyfriend" marked by A5, and the text information is sent to the server as the key information. Matched sticker information obtained based on the key information is marked by A5'. In FIG. 7 and FIG. 8, B1 is a button used for controlling the video recording, and B2 is a button used for replaying the recorded video.

Figure 9:
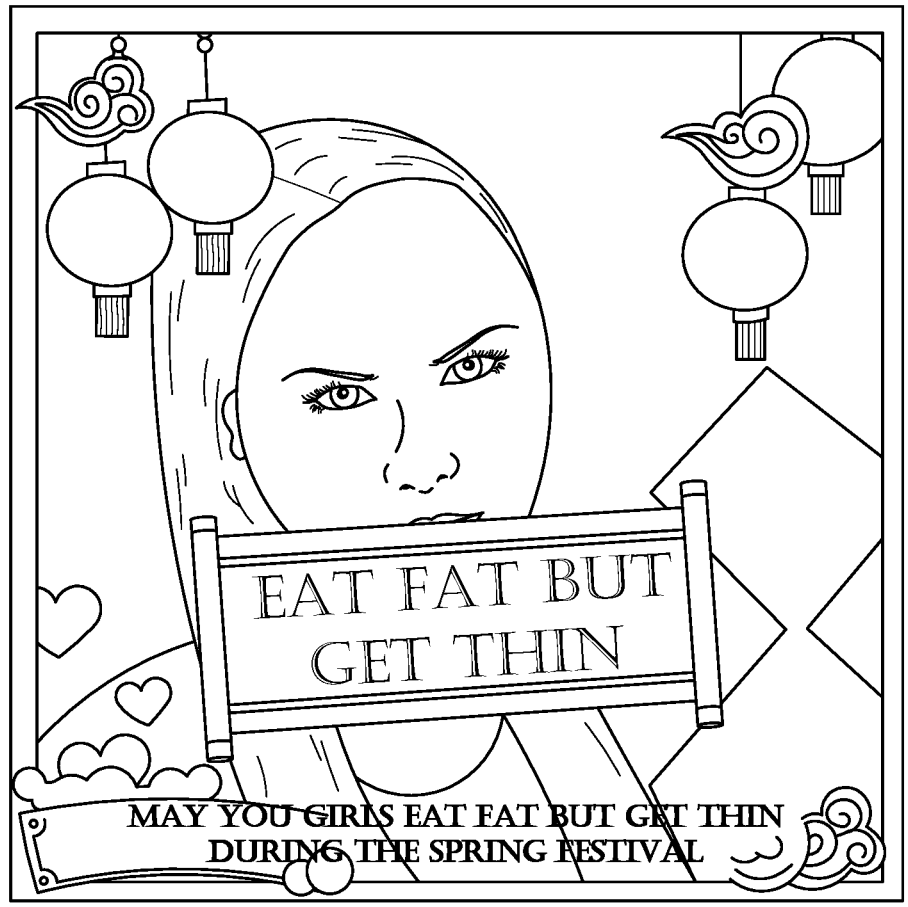
Figure 10:
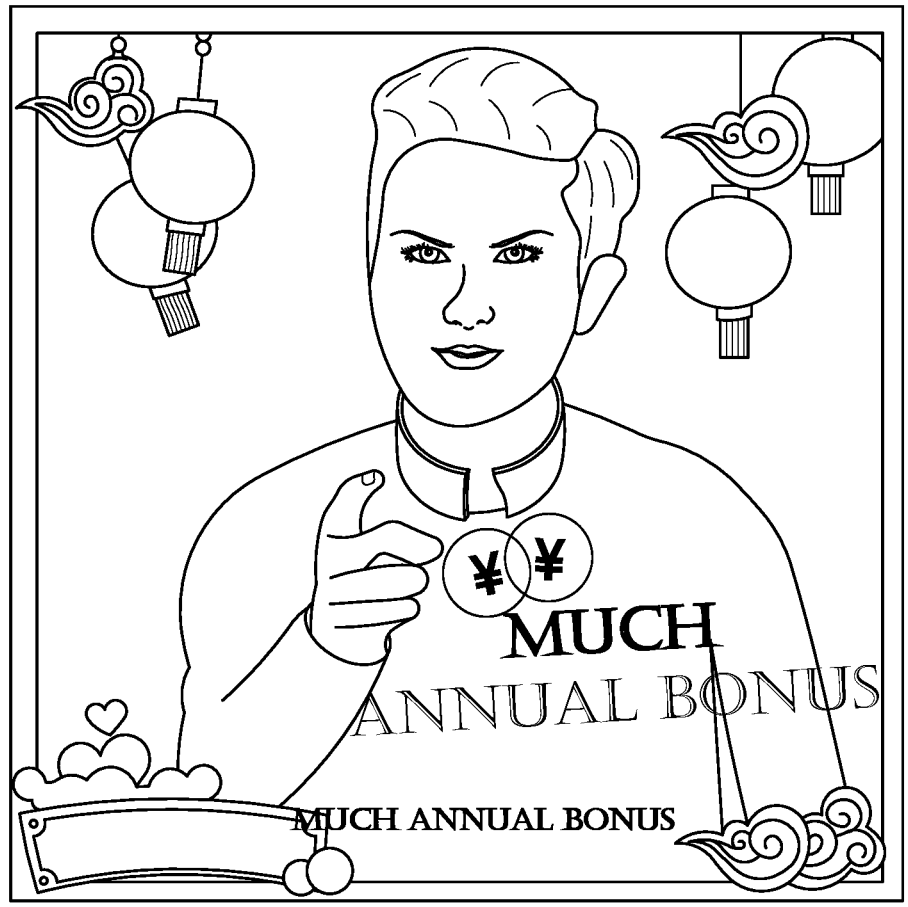

FIG. 9 is a schematic diagram of replaying a video after video synthesis is performed on sticker information and the video at an appropriate location and time point during video recording. In FIG. 9, when audio of "May you girls eat fat but get thin during the Spring Festival" is played in correspondingly recorded video information, a video interface may display text information corresponding to the audio. At this time point, the video interface may further display synthetic sticker information, which is a dynamic sticker effect "Eat fat but get thin" opened and displayed in a scroll form. FIG. 10 is another schematic diagram of replaying a video after video synthesis is performed on sticker information and the video at an appropriate location and time point during video recording according to this embodiment of this application. When audio of "Much annual bonus" is played in correspondingly recorded video information, a video interface may display text information corresponding to the audio. At this time point, the video interface may further display synthetic sticker information, to display "Much annual bonus" in a dynamic sticker effect in combination with an indicator of a currency unit such as ¥, so that the indicator is combined with the text "Much annual bonus."

Figure 11:
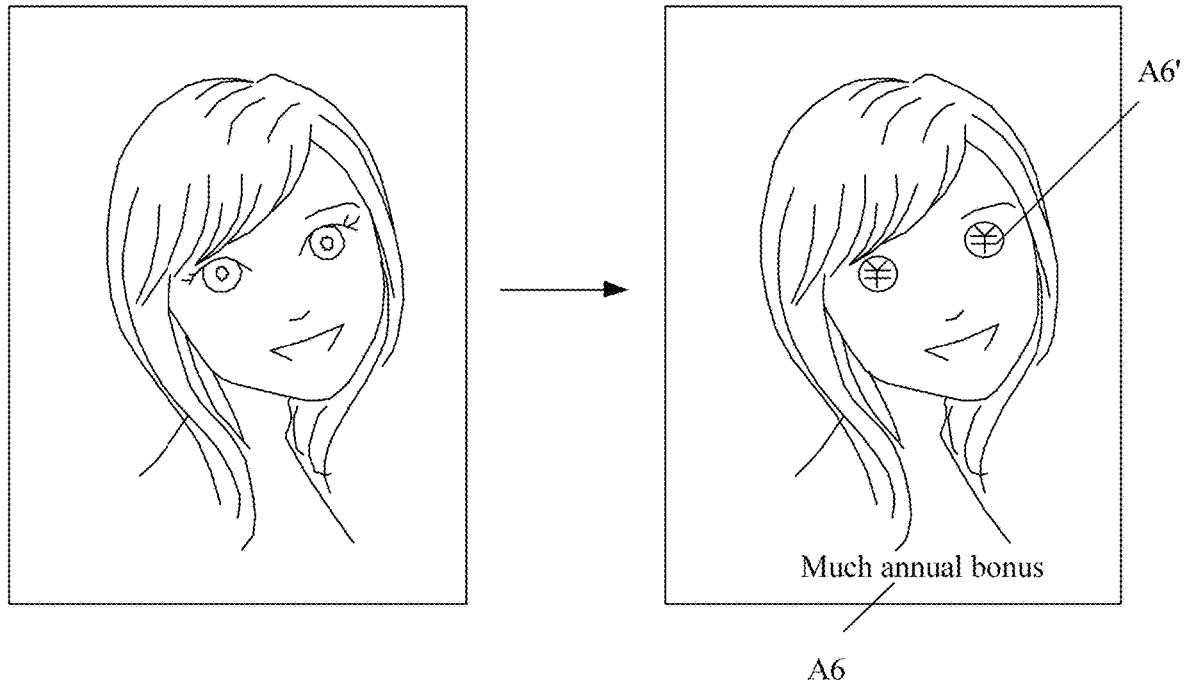

When the recorded video has the text information "Much annual bonus," in addition that sticker information of corresponding content is displayed as in FIG. 10, other sticker forms may further be obtained by recognizing a facial expression or a user action (or gesture of a user). As shown in FIG. 11, when audio of "Much annual bonus" marked by A6 is played in the recorded video information, the user action may be combined with the audio. For example, the user action may be the user blinking his eyes with joy. In this case, in addition to displaying the sticker information shown in FIG. 10, the video interface may further display other sticker information thereon within the time segment of "blinking eyes with joy." The other sticker information may be, for example, "Change eyes into two ¥" marked by A6'. In addition to blinking eyes, the user action may alternatively be snapping fingers. "Change eyes into two ¥" marked by A6' shown in FIG. 11 or the sticker information "Much annual bonus" shown in FIG. 10 is triggered by the user action for displaying.

Figure 12:
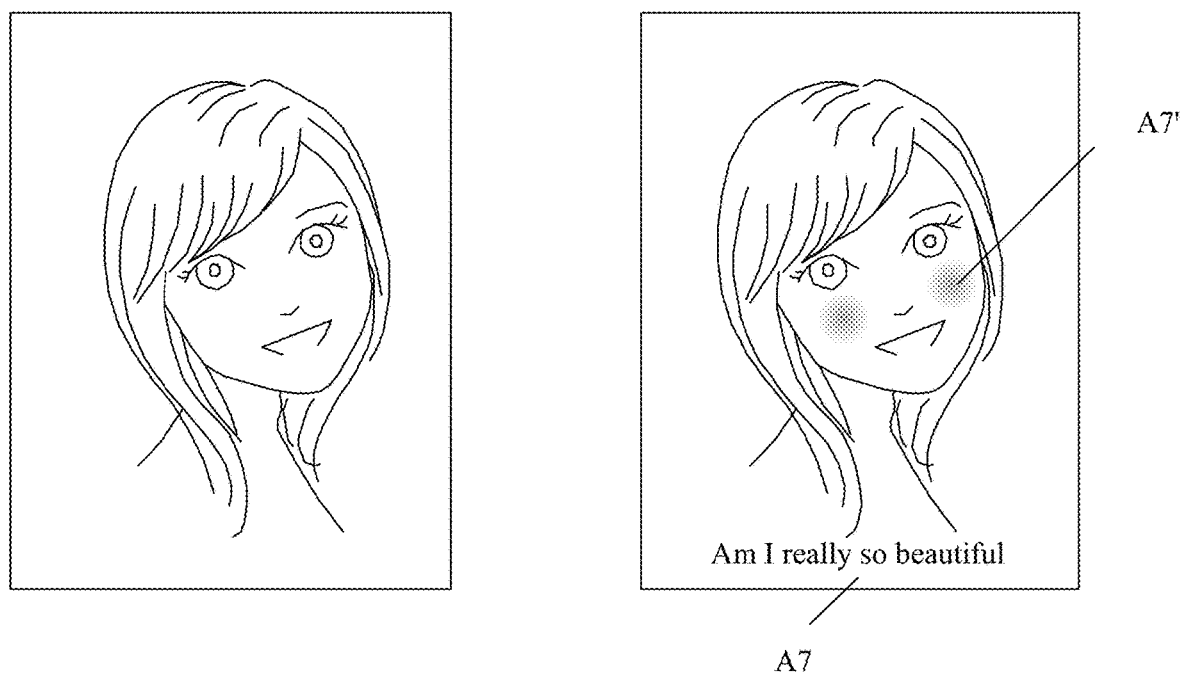

FIG. 12 shows another application example in which this embodiment of this application is used. In FIG. 12, other sticker forms may be obtained by recognizing a facial expression. As shown in FIG. 12, when audio of "Am I really so beautiful" marked by A7 is played in correspondingly recorded video information, the location of the cheek is recognized, and sticker information marked by A7' is superposed on the location of the cheek. Specifically, the sticker information is a red face, a blusher, or a blush in a five-sense-organ-type sticker. In this case, within the time segment of displaying "Am I really so beautiful" on the video interface, the video interface also displays synthetic sticker information of wearing a blush on the face.

Embodiment 2

Figure 13:
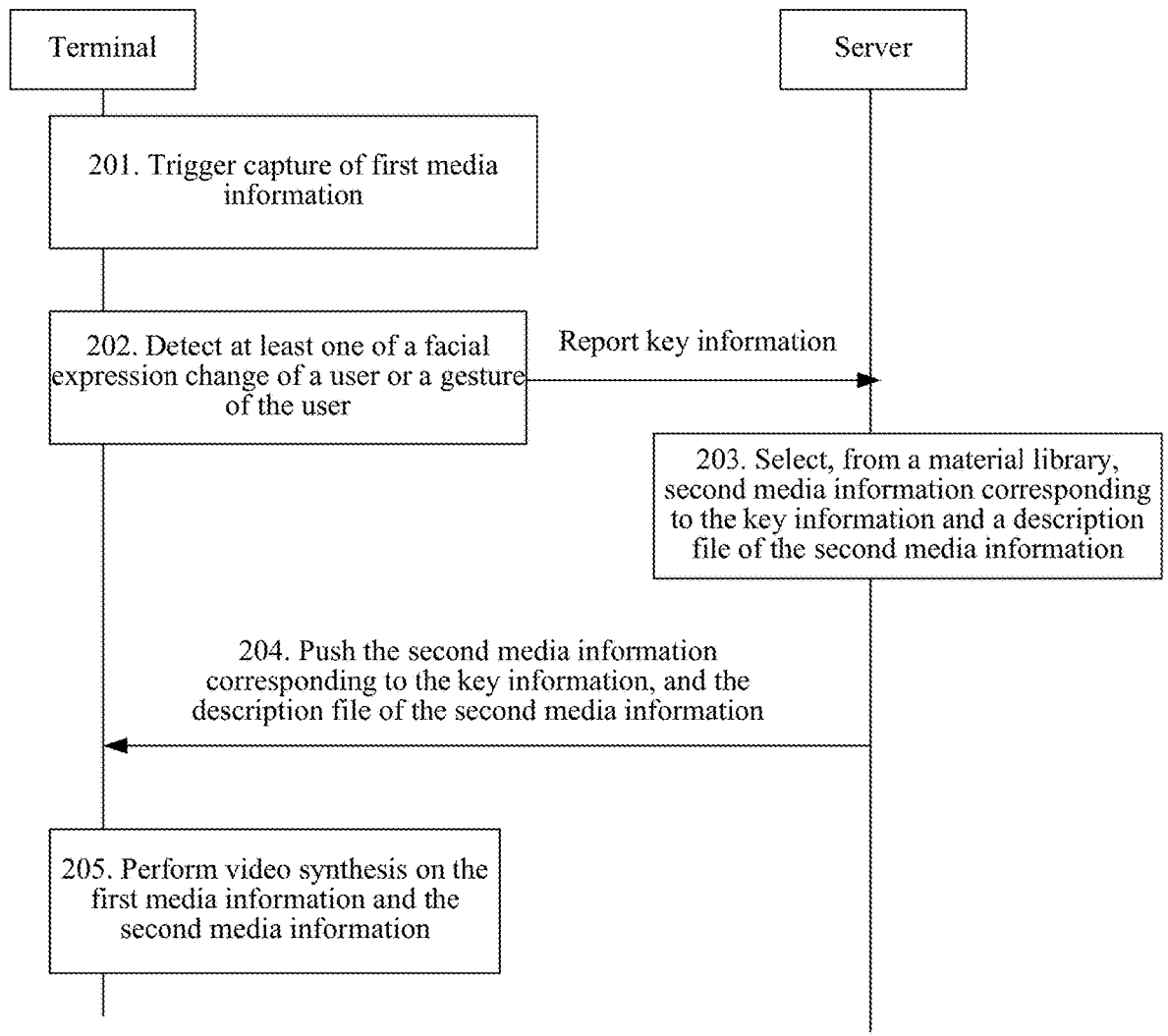
FIG. 13 is a schematic diagram of an implementation procedure according to Embodiment 2 of this application.

An information processing method according to this embodiment of this application is shown in FIG. 13. The method includes:

In step 201, a terminal enables an application and obtains a first operation to trigger collection (or capture) of first media information. For example, the terminal receives a first operation to trigger capture of first media information.

In an application scenario, as shown in FIG. 3, a user lain on a couch is using a terminal device such as a mobile phone 11. A user interface of the mobile phone 11 is shown in FIG. 4, which includes various types of application icons, for example, a music playback icon, a function setting icon, and an email receiving and sending icon. The user performs the first operation, for example, taps a video processing application icon marked by A1 with a finger, and enters a processing process of video recording, to trigger, for example, the collection of the first media information. For example, the user may record video while indoors or perform selfie or the like.

In step 202, when detecting an expression change (or facial expression change) meeting a preset condition in a face area or a user action change (or gesture) meeting a preset condition in a collection box during the collection of the first media information, the terminal reports an obtained change amount to a server as key information. For example, detecting at least one of a facial expression change of a user based on a first preset condition or a gesture of the user based on a second preset condition during the capture of the first media information, and sending the detected at least one of the facial expression change or the gesture of the user to a server as key information.

Herein, still with reference to the application scenario in step 201, in the processing process of video recording, the terminal device may capture an expression change (or facial expression change), such as a smile, a cry, or a frown, in the face area by using a facial recognition and positioning mechanism and an expression recognition mechanism. In addition, the terminal device may alternatively detect the user action change (or a gesture of a user), such as gesturing a V sign, in the collection box (or capture area or referred to as a framing area). Such detection is not limited to being performed in the face area. Combined recognition may further be performed on the expression change and the user action change in the face area. For example, combined recognition is performed on a combination of a V sign and a smile of facial expressions.

The facial recognition technology is to collect, based on facial features of a person, a face image or a video stream during video recording. During facial recognition, first, whether there is a face in the video stream is determined. If there is a face, the location and the size of the face are further provided, and the location information of each main facial organ is positioned, so that the respective locations and initial forms of five sense organs on the face are obtained. When the forms change, for example, when a person smiles, the locations of his upper and lower lips will generate displacement and a form change relative to the initial forms, and it indicates that facial expressions of the five sense organs on the face change. Changes in expressions may also be recognized by using the expression recognition mechanism. The facial recognition in this embodiment of this application is different from the related facial recognition. The related facial recognition is to recognize a user identity by constructing a facial recognition system, and compare the recognized face with a known face, so as to facilitate identity confirmation and identity searching.

An expression recognition process may include four phases: face image obtaining and pre-processing; face detection; expression feature extraction; and expression classification. If only the facial recognition and positioning mechanism is used, there may be a problem of imprecision. However, the expression recognition mechanism is a more accurate processing policy. Expression recognition is closely correlated to facial recognition. For example, positioning during face detection is similar to that in such links as face tracking, but a difference lies in feature extraction. For example, during facial recognition extraction, attention is mainly paid to individual differences and features of different faces, and a facial expression exists as an interference signal. That is, not too much attention is paid to the facial expression. However, in this embodiment of this application, attention needs to be paid to changes in expressions, to trigger corresponding second media information, and therefore, the individual differences may be neglected, but attention is paid to feature extraction of differential features of the faces in different expression modes. The expression recognition may be combined with the individual differences, or the individual differences may be processed as an interference signal to improve the expression recognition precision, that is, not too much attention is paid to the individual differences. Feature extraction is a core step during face expression recognition, determines a final recognition result, and affects the value of the recognition rate. The feature extraction may include static image feature extraction and moving image feature extraction. In terms of the static image feature extraction, form change features of an expression (or referred to as transient features of an expression) are extracted. In terms of the moving image feature extraction, not only form change features of an expression in each frame need to be extracted for a moving image, but also motion features of consecutive sequences need to be extracted. Extraction of the form change features may depend on a neutral expression or a model, so that a generated expression is compared with the neutral expression to extract the form change features. However, extraction of the moving features directly depends on a facial change generated by an expression. Expressions have various classification manners. For example, expressions are classified into: 1) happiness, sadness, surprise, fear, anger, disgust, and the like according to basic expressions, to set up different facial expression image libraries for subsequent matching and recognition; 2) joy, sadness, excitement, calmness, anxiety, relief, and the like according to emotions.

In step 203, the server selects second media information corresponding to the key information from a material library and a description file of the second media information.

In step 204, the terminal receives the second media information that is corresponding to the key information and that is pushed (or otherwise received) by the server, and the description file of the second media information from the server.

A specific implementation of this step may be: After step 202 of sending the key information to the server, the server finds the corresponding second media information, such as sticker information, from a material library by means of matching according to the key information, and pushes the second media information to the terminal, so that video synthesis is to be performed subsequently on the first media information and the second media information in step 205. The user does not need to manually choose the sticker information, but the sticker information is automatically pushed to the terminal after matching is performed according to the key information. During the collection of the first media information (for example, a video), the terminal automatically synthesizes (for example, superposes the video and the sticker information) a video processing result, and displays the sticker information at a specified location and specified time of the first media information (for example, the video).

Herein, in step 204, the description file of the second media information that is corresponding to the key information, and the second media information may be simultaneously sent or separately sent. This depends on the network status at that time. If the network status is desirable, the description file and the second media information may be simultaneously sent. If the network status is undesirable, to avoid data loss due to the poor network, the description file and the second media information may be separately sent.

In step 205, perform video synthesis on the first media information and the second media information.

In an implementation of this embodiment of this application, the key information further includes text information in the first media information.

Therefore, the method further includes: detecting the text information during the collection of the first media information, and sending or reporting the detected text information to the server as the key information.

In the related technology, the video information shown in FIG. 5 specifically includes text information "Booming" marked by A2. After recording of the video information ends, sticker information "Booming" marked by A2' is added. The sticker information is manually chosen from the material library of the server by means of interaction between the terminal and the server for many times. Subsequently, the sticker information is added to the video information that has been recorded.

FIG. 6 shows another application scenario of the related technology. Specifically, the video information includes text information "Boyfriend" marked by A3. After recording of the video information ends, sticker information "Boyfriend" marked by A3' is added. The sticker information is manually chosen from the material library of the server by means of interaction between the terminal and the server for many times. Subsequently, the sticker information is added to the video information that has been recorded. Such processing is very complex and needs user interaction for many times, and the user may not truly need the sticker that is subsequently found. Even if the user truly needs the sticker, the user needs to manually add the sticker to the video information that has been recorded, for example, move the sticker to an appropriate location in the video information.

By means of this embodiment of this application, a video shown in FIG. 7 includes text information "Eat fat but get thin" marked by A4, and the text information is sent to the server as the key information. Matched sticker information obtained based on the key information is marked by A4'. A video shown in FIG. 8 includes text information "Boyfriend" marked by A5, and the text information is sent to the server as the key information. Matched sticker information obtained based on the key information is marked by A5'. In FIG. 7 and FIG. 8, B1 is used for marking a control button during video recording, and B2 is used for marking a replay button after the video recording ends. As shown in FIG. 9, FIG. 9 is a schematic diagram of replaying a video after video synthesis is performed on sticker information and the video at an appropriate location and time point during video recording. In FIG. 9, when audio of "May you girls eat fat but get thin during the Spring Festival" is played in correspondingly recorded video information, a video interface may display text information corresponding to the audio. At this time point, the video interface may further display synthetic sticker information, which is a dynamic sticker effect "Eat fat but get thin" opened and displayed in a scroll form. FIG. 10 is another schematic diagram of replaying a video after video synthesis is performed on sticker information and the video at an appropriate location and time point during video recording according to this embodiment of this application. When audio of "Much annual bonus" is played in correspondingly recorded video information, a video interface may display text information corresponding to the audio. At this time point, the video interface may further display synthetic sticker information, to display "Much annual bonus" in a dynamic sticker effect in combination with an indicator of a currency unit such as ¥, so that the indicator is combined with the text "Much annual bonus."

When the recorded video has the text information "Much annual bonus," in addition that sticker information of corresponding content is displayed as in FIG. 10, other sticker forms may further be obtained by recognizing a face expression or a user action. As shown in FIG. 11, when audio of "Much annual bonus" marked by A6 is played in the recorded video information, the user action may be combined with the audio. For example, the user action may be that the user blinks his eyes with joy. In this case, in addition to displaying the corresponding text information shown in FIG. 10, the video interface may further display other sticker information thereon within the time segment of "blinking eyes with joy." The other sticker information may be, for example, "Change eyes into two ¥" marked by A6'. In addition to blinking eyes, the user action may alternatively be snapping fingers. "Change eyes into two ¥" marked by A6' shown in FIG. 11 or the sticker information "Much annual bonus" shown in FIG. 10 is triggered by the user action for displaying.

FIG. 12 shows another application example in which this embodiment of this application is used. In FIG. 12, other sticker forms may be obtained by recognizing a face expression. As shown in FIG. 12, when audio of "Am I really so beautiful" marked by A7 is played in correspondingly recorded video information, the location of the cheek is recognized, and sticker information marked by A7' is superposed on the location of the cheek. Specifically, the sticker information is a red face, a blusher, or a blush in a five-sense-organ-type sticker. In this case, within the time segment of displaying "Am I really so beautiful" on the video interface, the video interface also displays synthetic sticker information of wearing a blush on the face.

In an implementation of this embodiment of this application, the performing video synthesis on the first media information and the second media information includes:

in a first implementation solution, obtaining a corresponding feature detection result, and performing video synthesis on the second media information and the first media information according to the feature detection result and a configuration of the description file of the second media information in response to the expression change or the user action change, to display, at a specified time point or within a specified time segment, the second media information at a location specified by the first media information; or in a second implementation solution, performing video synthesis on the second media information and the first media information according to a configuration of the description file of the second media information in response to the text information, to display, at a specified time point or within a specified time segment, the second media information at a location specified by the first media information.

A difference between the two solutions lies in that: In the first solution, a feature coordinate (which is a part of or all the information of the feature detection result) needs to be obtained, so that in combination of the feature coordinate, an appropriate specified location at which the sticker information is to be placed in the video information is determined. The second media information may determine the time point. The sticker information is placed according to fixed requirements on the location and time, and according to the specified location and time point, the sticker information can be superposed on the video information at the appropriate location and the appropriate time point, as it is done in the scenario of "wearing a blush on the face" shown in FIG. 12. In the second solution, the feature coordinate does not need to be considered. The second media information may determine the attributes such as the time point and the size of the sticker, and may further include the location of a central point of the sticker information. Although the sticker is placed according to fixed requirements on the location and time, the sticker is more arbitrarily placed compared with how it is done in the first solution. As shown in FIG. 7, it is desirable provide that "Eat fat but get thin" occurs, but it is not limited that "Eat fat but get thin" should be necessarily displayed at a particular location corresponding to the face area. In the first solution, a sticker request is triggered by the expression change or the user action change, and therefore, the sticker needs to be displayed in cooperation with the expression change and the user action change.

In an implementation of this embodiment of this application, the second multimedia information includes at least one of the following: 1) first-type sticker information triggered by the expression change or the user action change for displaying, such as a five-sense-organ-type sticker or a trigger-type sticker; and 2) second-type sticker information triggered by other changes than the expression change or the user action change for displaying, such as a common sticker and a background sticker.

In an implementation of this embodiment of this application, the obtaining a corresponding feature detection result, and performing video synthesis on the second media information and the first media information according to the feature detection result and a configuration of the description file of the second media information in response to the expression change or the user action change includes:

a1. reporting a detected expression change or user action change to the server, to request for the first-type sticker information and a description file of the first-type sticker information;

a2. detecting a feature coordinate change caused by the expression change or the user action change, and performing positioning from an initial coordinate to a target coordinate, to determine, according to a location point positioned by using the target coordinate or a location area defined from the initial coordinate to the target coordinate, a location on which the first-type sticker information is to be superposed;

a3. parsing the description file of the received first-type sticker information to obtain display time of the first-type sticker information; and a4. performing video synthesis on the second media information and the first media information according to the determined location and the display time of the first-type sticker information obtained by means of parsing.

In an implementation of this embodiment of this application, the performing video synthesis on the second media information and the first media information according to a configuration of the description file of the second media information in response to the text information includes:

b1. reporting detected text information to the server in response to the text information to request for the second-type sticker information and a description file of the second-type sticker information;

b2. parsing the description file of the received second-type sticker information, to obtain the location of the second-type sticker information relative to the first media information, and display time of the second-type sticker information, where the location includes the location of a central point displayed in the second-type sticker information; and b3. performing video synthesis on the second media information and the first media information according to the obtained location and the display time.

Embodiment 3

Figure 14:
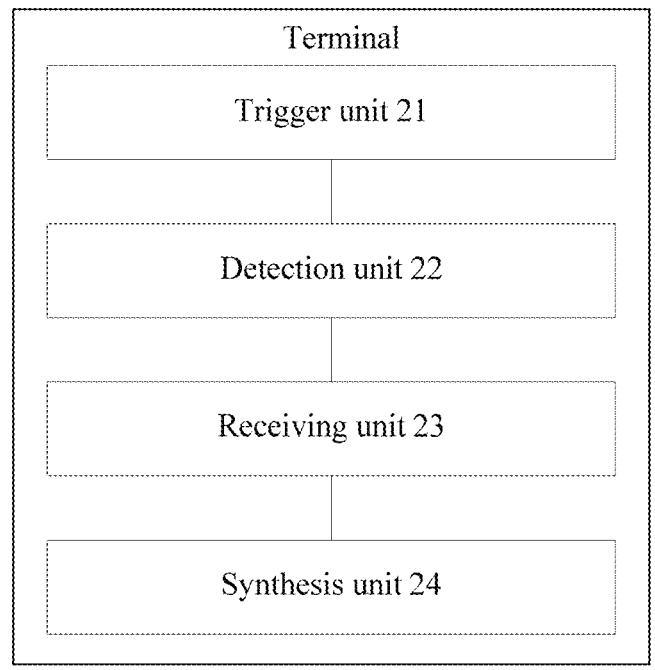
FIG. 14 is a schematic diagram of compositional structures according to Embodiment 3 of this application.

A terminal is provided according to this embodiment of this application. As shown in FIG. 14, the terminal includes: a trigger unit 21, configured to obtain a first operation, to trigger collection (or capture) of first media information; a detection unit 22, configured to: when detecting an expression change meeting a preset condition in a face area or a user action change meeting a preset condition in a collection box during the collection of the first media information, report an obtained change amount to a server as key information; a receiving unit 23, configured to receive second media information that is corresponding to the key information and that is pushed by the server; and a synthesis unit 24, configured to perform video synthesis on the first media information and the second media information. For example, the detection unit 22 is configured to detect at least one of a facial expression change of a user based on a first preset condition in a face area or a gesture of a user (user action) based on a second preset condition in a collection box or capture area during the collection of the first media information, report or send the detected at least one of a facial expression change or a gesture of a user to a server as key information.

In an application scenario, as shown in FIG. 3, a user lain on a couch is using a terminal device such as a mobile phone 11. A user interface of the mobile phone 11 is shown in FIG. 4, which includes various types of application icons, for example, a music playback icon, a function setting icon, and an email receiving and sending icon. The user performs the first operation, for example, taps a video processing application icon marked by A1 with a finger, and enters a processing process of video recording, to trigger, for example, the collection of the first media information. For example, the user may record a video while indoors or perform selfie or the like. In the processing process of video recording, the terminal may capture an expression change, such as a smile, a cry, or a frown, in the face area by using a facial recognition and positioning mechanism and an expression recognition mechanism. In addition, the terminal device may alternatively detect the user action change, such as gesturing a V sign, in the collection box (or referred to as a framing box). Combined recognition may further be performed on the expression change and the user action change in the face area. For example, combined recognition is performed on a combination of a V sign and a smile of facial expressions.

The facial recognition technology is to collect, based on facial features of a person, a face image or a video stream during video recording. During facial recognition, first, whether there is a face in the video stream is determined. If there is a face, the location and the size of the face are further provided, and the location information of each main facial organ is positioned, so that the respective locations and initial forms of five sense organs on the face are obtained. When the forms change, for example, when a person smiles, the locations of his upper and lower lips will generate displacement and a form change relative to the initial forms, and it indicates that facial expressions of the five sense organs on the face change. Changes in expressions may also be recognized by using the expression recognition mechanism. The facial recognition in this embodiment of this application is different from the related facial recognition. The related facial recognition is to recognize a user identity by constructing a facial recognition system, and compare the recognized face with a known face, so as to facilitate identity confirmation and identity searching.

An expression recognition process may include four phases: face image obtaining and pre-processing; face detection; expression feature extraction; and expression classification. If only the facial recognition and positioning mechanism is used, there may be a problem of imprecision. However, the expression recognition mechanism is a more accurate processing policy. Expression recognition is closely correlated to facial recognition. For example, positioning during face detection is similar to that in such links as face tracking, but a difference lies in feature extraction. For example, during facial recognition extraction, attention is mainly paid to individual differences and features of different faces, and a facial expression exists as an interference signal. Therefore, not too much attention is paid to the facial expression during facial recognition. However, in this embodiment of this application, attention needs to be paid to changes in expressions, to trigger corresponding second media information, and therefore, the individual differences may be neglected, but attention is paid to feature extraction of differential features of the faces in different expression modes. The expression recognition may be combined with the individual differences, or the individual differences may be processed as an interference signal to improve the expression recognition precision, that is, not too much attention is paid to the individual differences. Feature extraction is a core step during face expression recognition, determines a final recognition result, and affects the value of the recognition rate. The feature extraction may include static image feature extraction and moving image feature extraction. In terms of the static image feature extraction, form change features of an expression (or referred to as transient features of an expression) are extracted. In terms of the moving image feature extraction, not only form change features of an expression in each frame need to be extracted for a moving image, but also motion features of consecutive sequences need to be extracted. Extraction of the form change features may depend on a neutral expression or a model, so that a generated expression is compared with the neutral expression to extract the form change features. However, extraction of the moving features directly depends on a facial change generated by an expression. Expressions have various classification manners. For example, expressions are classified into: 1) happiness, sadness, surprise, fear, anger, disgust, and the like according to basic expressions, to set up different facial expression image libraries for subsequent matching and recognition; 2) joy, sadness, excitement, calmness, anxiety, relief, and the like according to emotions.

In an implementation of this embodiment of this application, the key information further includes text information in the first media information.

The detection unit 22 is further configured to: detect the text information during the collection of the first media information, and report the detected text information to the server as the key information.

In the related technology, the video information shown in FIG. 5 specifically includes text information "Booming" marked by A2. After recording of the video information ends, sticker information "Booming" marked by A2' is added. The sticker information is manually chosen from a material library of the server by means of interaction between the terminal and the server for many times. Subsequently, the sticker information is added to the video information that has been recorded.

FIG. 6 shows another application scenario of the related technology. Specifically, the video information includes text information "Boyfriend" marked by A3. After recording of the video information ends, sticker information "Boyfriend" marked by A3' is added. The sticker information is manually chosen from the material library of the server by means of interaction between the terminal and the server for many times. Subsequently, the sticker information is added to the video information that has been recorded. Such processing is very complex and needs user interaction for many times, and the user may not truly need the sticker that is subsequently found. Even if the user truly needs the sticker, the user needs to manually add the sticker to the video information that has been recorded, for example, move the sticker to an appropriate location in the video information.

By means of this embodiment of this application, a video shown in FIG. 7 includes text information "Eat fat but get thin" marked by A4, and the text information is sent to the server as the key information. Matched sticker information obtained based on the key information is marked by A4'. A video shown in FIG. 8 includes text information "Boyfriend" marked by A5, and the text information is sent to the server as the key information. Matched sticker information obtained based on the key information is marked by A5'. In FIG. 7 and FIG. 8, B1 is used for marking a control button during video recording, and B2 is used for marking a replay button after the video recording ends. As shown in FIG. 9, FIG. 9 is a schematic diagram of replaying a video after video synthesis is performed on sticker information and the video at an appropriate location and time point during video recording. In FIG. 9, when audio of "May you girls eat fat but get thin during the Spring Festival" is played in correspondingly recorded video information, a video interface may display text information corresponding to the audio. At this time point, the video interface may further display synthetic sticker information, which is a dynamic sticker effect "Eat fat but get thin" opened and displayed in a scroll form. FIG. 10 is another schematic diagram of replaying a video after video synthesis is performed on sticker information and the video at an appropriate location and time point during video recording according to this embodiment of this application. When audio of "Much annual bonus" is played in correspondingly recorded video information, a video interface may display text information corresponding to the audio. At this time point, the video interface may further display synthetic sticker information, to display "Much annual bonus" in a dynamic sticker effect in combination with an indicator of a currency unit such as ¥, so that the indicator is combined with the text "Much annual bonus."

When the recorded video has the text information "Much annual bonus," in addition that sticker information of corresponding content is displayed as in FIG. 10, other sticker forms may further be obtained by recognizing a face expression or a user action. As shown in FIG. 11, when audio of "Much annual bonus" marked by A6 is played in the recorded video information, the user action may be combined with the audio. For example, the user action may be that the user blinks his eyes with joy. In this case, in addition to displaying the sticker information shown in FIG. 10, the video interface may further display other sticker information thereon within the time segment of "blinking eyes with joy." The other sticker information may be, for example, "Change eyes into two ¥" marked by A6'. In addition to blinking eyes, the user action may alternatively be snapping fingers. "Change eyes into two ¥" marked by A6' shown in FIG. 11 or the sticker information "Much annual bonus" shown in FIG. 10 is triggered by the user action for displaying.

FIG. 12 shows another application example in which this embodiment of this application is used. In FIG. 12, other sticker forms may be obtained by recognizing a face expression. As shown in FIG. 12, when audio of "Am I really so beautiful" marked by A7 is played in correspondingly recorded video information, the location of the cheek is recognized, and sticker information marked by A7' is superposed on the location of the cheek. Specifically, the sticker information is a red face, a blusher, or a blush in a five-sense-organ-type sticker. In this case, within the time segment of displaying "Am I really so beautiful" on the video interface, the video interface also displays synthetic sticker information of wearing a blush on the face.

In an implementation of this embodiment of this application, the receiving unit 24 is further configured to receive a description file of the second media information that is corresponding to the key information and that is pushed by the server.

The description file includes the location of the second media information relative to the first media information, and display time of the second media information.

In an implementation of this embodiment of this application, the synthesis unit 24 is further configured to perform video synthesis on the first media information and the second media information according to the description file, to display, within the display time specified by the description file, the second media information at the location that is of the first media information and that is specified by the description file. Specifically, the synthesis unit 24 includes two specific implementations:

in a first specific implementation, obtaining a corresponding feature detection result, and performing video synthesis on the second media information and the first media information according to the feature detection result and a configuration of the description file of the second media information in response to the expression change or the user action change, to display, at a specified time point or within a specified time segment, the second media information at a location specified by the first media information; or in a second specific implementation, performing video synthesis on the second media information and the first media information according to a configuration of the description file of the second media information in response to the text information, to display, at a specified time point or within a specified time segment, the second media information at a location specified by the first media information.

In an implementation of this embodiment of this application, the second multimedia information includes at least one of the following:

first-type sticker information triggered by the expression change or the user action change for displaying; and second-type sticker information triggered other changes than the expression change or the user action change for displaying.

In an implementation of this embodiment of this application, the synthesis unit 24 is further configured to:

report a detected expression change or user action change to the server, to request for the first-type sticker information and a description file of the first-type sticker information;

detect a feature coordinate change caused by the expression change or the user action change, and performing positioning from an initial coordinate to a target coordinate, to superpose the first-type sticker information according to a location point positioned by using the target coordinate or a location area defined from the initial coordinate to the target coordinate;

parse the description file of the received first-type sticker information, to obtain to-be-displayed specified time of the first-type sticker information; and perform video synthesis on the second media information and the first media information according to the location point or the location specified by the location area and the specified time.

In an implementation of this embodiment of this application, the synthesis unit is further configured to:

report detected text information to the server in response to the text information, to request for the second-type sticker information and a description file of the second-type sticker information;

parse the description file of the received second-type sticker information, to obtain a to-be-displayed specified location and to-be-displayed specified time of the second-type sticker information, where the specified location includes the location of a central point displayed in the second-type sticker information; and perform video synthesis on the second media information and the first media information according to the specified location and the specified time.

Embodiment 4

Herein, it is noted that the foregoing terminal may be an electronic device such as a PC, or may be a portable electronic device such as a PAD, a tablet computer, a laptop computer, or may be an intelligent mobile terminal such as a mobile phone. The terminal is not limited to the description herein. The foregoing server may be an electronic device that is constructed by using a cluster system and integrated for implementing functions of all units, or may be an electronic device that is constructed by using a cluster system and of which functions of all units are separately provided. Both the terminal and the server at least include a data base for data storage and a processor or other circuitry for data processing, or include a storage medium disposed in the server or an independently disposed storage medium.

For the processor for data processing, during execution of processing, the processor may be implemented by using a microcomputer, a central processing unit (CPU), a digital signal processor (DSP), or a field programmable gate array (FPGA). For a storage medium, operation instructions are included. The operation instructions may be computer executable code that performs each step in the procedure of the information processing method according to the embodiments of this application by using the operation instructions.

Figure 15:
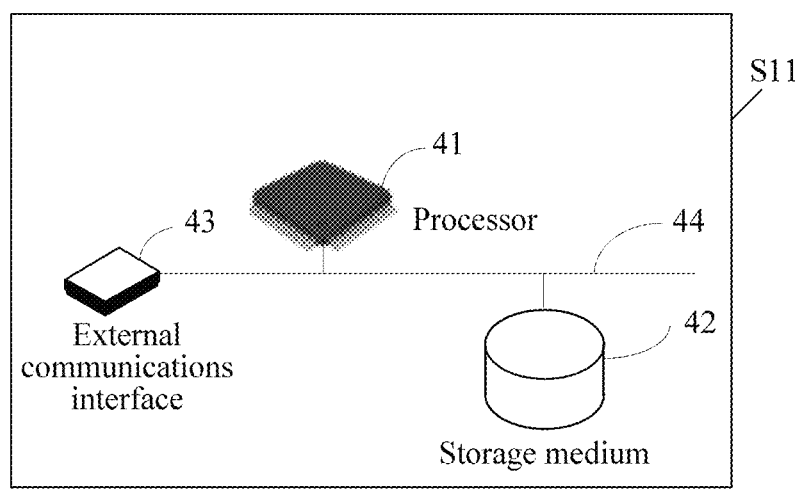
FIG. 15 is a schematic diagram of compositional structures of hardware according to Embodiment 4 of this application.

The terminal and the server are shown in FIG. 15 as examples of hardware entities S11. The apparatus includes a processor 41, a storage medium 42, and at least one external communications interface 43. The processor 41, the storage medium 42, and the external communications interface 43 are connected to each other by using a bus 44.

Herein, it is noted that the foregoing descriptions of the terminal and the server is similar to that of the method. A description of beneficial effects of the terminal and the server is similar to that of the method and are not described again. For technical details not disclosed in the terminal and server embodiment of this application, refer to the description of the method embodiment of this application.

This embodiment of this application is described below by using an actual application scenario as an example:

First, the application scenario is described: First, some correlated dynamic stickers are usually added to a video material according to the content played by the material, so that the video displays more abundant content. A) For example, in a video for paying a New Year call, when a wish for good fortune is expressed, falling of some gold coins may be expected; B) For another example, when a shy state of a character needs to be presented in the video content, a special effect of adding a blush on the user face may be expected. Second, there may be such a requirement as taking a photo with a celebrity in a video. In this case, a photo of the celebrity may be used as a foreground sticker, so that the user can take a photo with the celebrity. In the related technology, a schematic diagram obtained by using the video processing technology is shown in FIG. 5 and FIG. 6. Text information shown in FIG. 5 specifically includes text information "Booming" marked by A2 included in video information. After recording of the video information ends, sticker information "Booming" marked by A2' is added. The sticker information is manually chosen from a material library of the server by means of interaction between the terminal and the server for many times. Subsequently, the sticker information is added to the video information that has been recorded.

FIG. 6 shows another application scenario of the related technology. Specifically, the video information includes text information "Boyfriend" marked by A3. After recording of the video information ends, sticker information "Boyfriend" marked by A3' is added. The sticker information is manually chosen from the material library of the server by means of interaction between the terminal and the server for many times. Subsequently, the sticker information is added to the video information that has been recorded. Such processing is very complex and needs user interaction for many times, and the user may not truly need the sticker that is subsequently found. Even if the user truly needs the sticker, the user needs to manually add the sticker to the video information that has been recorded, for example, move the sticker to an appropriate location in the video information.

In the scenarios shown in FIG. 5 and FIG. 6, the related processing technology is used: An application (APP) provides some fixed stickers, and the user records a video first. After the video has been recorded, the user chooses materials that he considers to be correlated to the video from a sticker material library, and determines, by means of complex interaction, a time point at which each sticker is to be added and a time segment for which each sticker is to be added. Moreover, some APPs permit the sticker to move, and then the user needs to hold and drag the sticker, to determine a specific location to which the sticker is moved. Consequently, complex interaction needs to be performed between the terminal and the server for many times, the processing efficiency is low, the sticker is manually chosen for final synthesis after the video has been recorded, video processing costs are high, time is wasted, and a user requirement is not necessarily met.

For the foregoing application scenario, this embodiment of this application is a real-time dynamic-effect sticker solution correlated to a video. By using the facial recognition and positioning mechanism, the expression recognition mechanism, and the video synthesis and processing mechanism in this application, the user does not need to perform complex operations and choose sticker information correlated to a video material from a pile of materials, but chooses a material video instead. During recording, the user sees that corresponding sticker information occurs at a corresponding location and at corresponding time, that is, corresponding sticker information is superposed in real time on a corresponding specified location at a corresponding specified time point during the video cording, as shown in FIG. 7 to FIG. 12.

By means of this embodiment of this application, a video shown in FIG. 7 includes text information "Eat fat but get thin" marked by A4, and the text information is sent to the server as the key information. Matched sticker information obtained based on the key information is marked by A4'. A video shown in FIG. 8 includes text information "Boyfriend" marked by A5, and the text information is sent to the server as the key information. Matched sticker information obtained based on the key information is marked by A5'. In FIG. 7 and FIG. 8, B1 is used for marking a control button during video recording, and B2 is used for marking a replay button after the video recording ends. As shown in FIG. 9, FIG. 9 is a schematic diagram of replaying a video after video synthesis is performed on sticker information and the video at an appropriate location and time point during video recording. In FIG. 9, when audio of "May you girls eat fat but get thin during the Spring Festival" is played in correspondingly recorded video information, a video interface may display text information corresponding to the audio. At this time point, the video interface may further display synthetic sticker information, which is a dynamic sticker effect "Eat fat but get thin" opened and displayed in a scroll form. FIG. 10 is another schematic diagram of replaying a video after video synthesis is performed on sticker information and the video at an appropriate location and time point during video recording according to this embodiment of this application. When audio of "Much annual bonus" is played in correspondingly recorded video information, a video interface may display text information corresponding to the audio. At this time point, the video interface may further display synthetic sticker information, to display "Much annual bonus" in a dynamic sticker effect in combination with an indicator of a currency unit such as ¥, so that the indicator is combined with the text "Much annual bonus."

When the recorded video has the text information "Much annual bonus," in addition that sticker information of corresponding content is displayed as in FIG. 10, other sticker forms may further be obtained by recognizing a face expression or a user action. As shown in FIG. 11, when audio of "Much annual bonus" marked by A6 is played in the recorded video information, the user action may be combined with the audio. For example, the user action may be that the user blinks his eyes with joy. In this case, in addition to displaying the sticker information shown in FIG. 10, the video interface may further display other sticker information thereon within the time segment of "blinking eyes with joy." The other sticker information may be, for example, "Change eyes into two ¥" marked by A6'. In addition to blinking eyes, the user action may alternatively be snapping fingers. "Change eyes into two ¥" marked by A6' shown in FIG. 11 or "Much annual bonus" shown in FIG. 10 is triggered by the user action for displaying.

FIG. 12 shows another application example in which this embodiment of this application is used. In FIG. 12, other sticker forms may be obtained by recognizing a face expression. As shown in FIG. 12, when audio of "Am I really so beautiful" marked by A7 is played in correspondingly recorded video information, the location of the cheek is recognized, and sticker information marked by A7' is superposed on the location of the cheek. Specifically, the sticker information is a red face, a blusher, or a blush in a five-sense-organ-type sticker. In this case, within the time segment of displaying "Am I really so beautiful" on the video interface, the video interface also displays synthetic sticker information of wearing a blush on the face.

When the recording ends, corresponding sticker information also have occurred in the video.

Herein, it is noted that the sticker information includes the following types:

A) a common sticker, which includes a falling gold coin, a shaking red packet, and a flower in bloom;

B) a five-sense-organ sticker, which may be specified to occur at specific locations of the five sense organs and move as the five sense organs move, such as a blush on the face, and glasses;

C) a trigger-type sticker, which is a group of changing stickers that occurs when a specific action is detected, where the group of stickers that occurs may be common stickers or may be five-sense-organ stickers; and D) a background sticker, which is several frames of videos that cover the uppermost part of a video and that are repeatedly played, such as a frame-type sticker "Eat fat but get thin" shown in FIG. 8.

Figure 17:
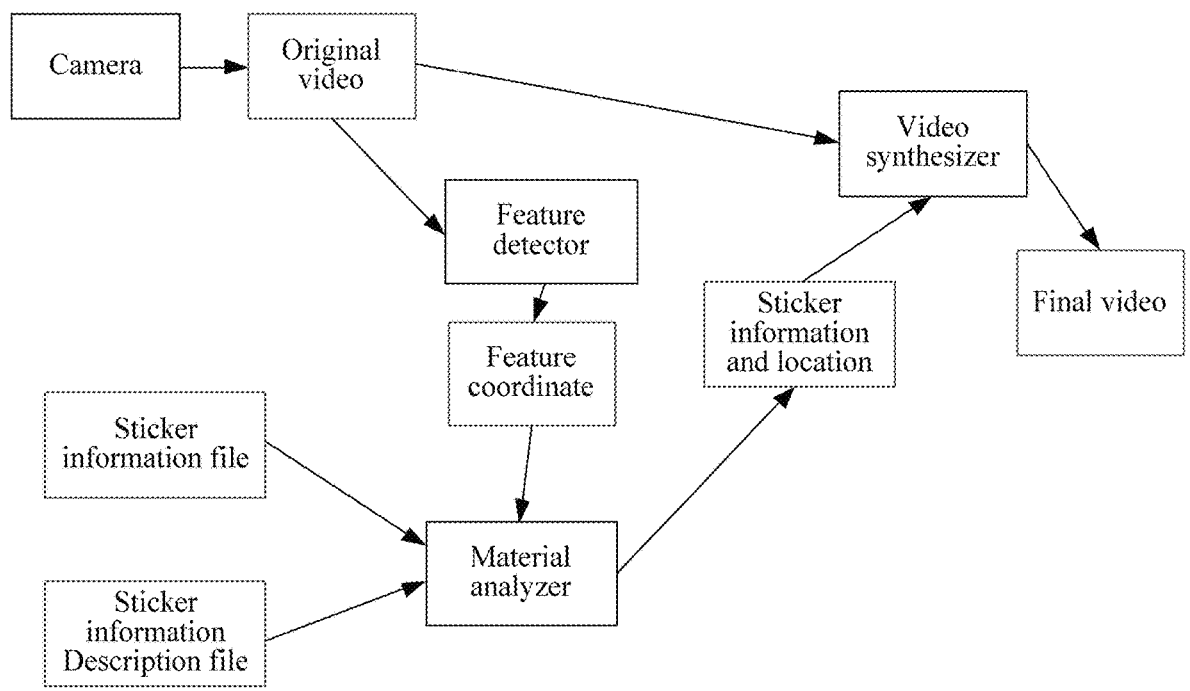
FIG. 17 is a systematic architectural diagram of an example to which an embodiment of this application is applied.

Among the foregoing four types of sticker information, the trigger-type sticker and the five-sense-organ-type sticker shown in FIG. 17 need a combination of sticker information and a feature coordinate which is then synthesized with a recorded video. The trigger-type sticker and the five-sense-organ-type sticker need to interact with a feature detector and a material analyzer in FIG. 17, and then interact with a video synthesizer, because coordinates change as expressions, actions, and the five sense organs change, However, for other types of stickers (the common sticker and the background sticker) than the trigger-type sticker and the five-sense-organ-type sticker, sticker information is directly synthesized with the recorded video. That is, the other types of stickers only interact with the video synthesizer in FIG. 17, because coordinates usually do not change.

To achieve the final effect shown in FIG. 7 to FIG. 12, the following content is included in technical implementation:

First, sticker information of each video is used as a part of a material in a material packet, and is delivered along with the material. In addition to the sticker information, the material further includes a description file of the sticker information and the like.

Figure 16:
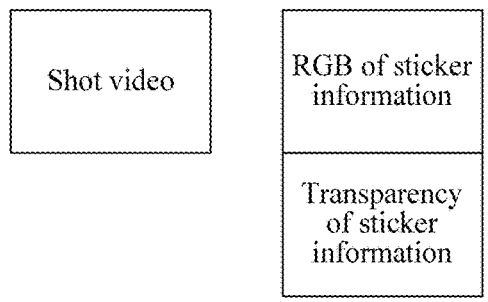
FIG. 16 is a schematic diagram of a scenario in which RGB and transparency are separately stored and to which an embodiment of this application is applied.

Second, a dynamic material includes two parts:

A) An initial form of sticker information, which mainly has three formats: i) a static chartlet; ii) a dynamic graphics interchange format (Gif) image; and iii) a video. For an image-type sticker information file (such as a static chartlet and a dynamic Gif image), video synthesis may be implemented by superposing images having transparency, such as portable network graphic format (PNG) images. However, for most video-type sticker information files (such as videos), the video-type sticker information file does not have transparency, and therefore, when a video is used as a material, the resolution of the material video is twice that of the shot video. One half of pixels are used for indicating the RGB value of the sticker, and the other half of the pixels is used for indicating the transparency of the sticker. Specifically, a storage manner of video-type sticker information is that: RGB and transparency are in separate channels, and a shot video is stored with one half being material RGB and the other half being material transparency, as shown in FIG. 16. Such a color mode as RGB is a color standard. Various colors are obtained by means of changes in channels of three colors, red (R), green (G), and blue (B), and superposition between the three colors. RGB represents the colors of the channels of R, G, and B. This standard almost includes all colors perceivable by the human sight.

When video superposition is performed on sticker information and a shot video to obtain a synthetic video, when the transparency of a pixel on the sticker information is a, the RGB value of the synthetic video=a*the RGB value of the video-type sticker information+(1−a)*the RGB value of the shot video.

B) A description file of a sticker, which includes such information as: i) the location of a central point occurring in a chartlet; and ii) time at which the chartlet occurs. Therefore, the terminal may actively push a sticker according to the sticker information and the description file of the sticker, so that an appropriate dynamic sticker may be superposed on an appropriate location at an appropriate time point of a video that is being recorded, and the user does not need to manually choose a sticker. The time at which the chartlet occurs includes: a) For a dynamic chartlet played once, start time needs to be set; and b) for a dynamic chartlet repeatedly played, start time and end time need to be set.

C) Five-sense-organ information including information about: i) top of head; ii) eyes; iii) cheek; iv) mouth; and v) nose needs to be set for the five-sense-organ-type sticker.

D) A trigger condition, which specifically includes: i) opening the mouth; ii) blinking the eyes; iii) smiling; and iv) raising the eyebrows needs to be set for the trigger-type sticker.

E) Hierarchical relationships between different materials.

Third, when a material is previewed, a file of the dynamic sticker is parsed.

Four, during video recording, the dynamic sticker is drawn according to the description file of the sticker information, so that the dynamic sticker is visible in real time. If the dynamic sticker is a five-sense-organ-type sticker or a trigger-type sticker, the dynamic sticker further includes a face detection algorithm as a systematic component. It needs to be noted that the face detection algorithm uses the related face detection algorithm, and the face detection algorithm does not fall within the patent scope. During drawing of the sticker, the sticker is drawn at an appropriate location according to a face detection result, as shown in FIG. 17 which is a schematic structural diagram of an entire system. In an embodiment, the modules shown in FIG. 17 are located at the terminal side. For the trigger-type sticker and the five-sense-organ-type sticker, sticker information needs to be combined with a feature coordinate, and then is synthesized with a recorded video. That is, the trigger-type sticker and the five-sense-organ-type sticker need to interact with a feature detector and a material analyzer, and then interact with a video synthesizer, because coordinates change as expressions, actions, and the five sense organs change. Specifically, the terminal shoots an original video by using an application (for example, a camera application). During shooting, the terminal detects a face area in each image in the original video or a feature of a user action in a framing box by using a feature detector, to obtain specific feature parameters and corresponding feature coordinates by means of analysis. The feature coordinates include an original coordinate, and a target coordinate after a form change. After receiving the sticker information and the description file of the sticker information that are sent by the server based on the feature parameters obtained by the server by means of matching, the terminal parses the sticker information and the description file of the sticker information by using the material analyzer, to obtain information such as the sticker information and the attribute thereof, and a superposition location and a superposition time point. Video synthesis is performed, by using a video synthesizer according to the feature coordinates, the information such as the superposition location and the superposition time point that are indicated by the description file of the sticker information, on the sticker information and the original video that is currently being shot, so that a video processing result including the sticker information is generated. For other types of stickers (the common sticker and the background sticker) than the trigger-type sticker and the five-sense-organ sticker, sticker information is directly synthesized with a recorded video, that is, the sticker information only interacts with a video synthesizer, because coordinates generally do not change. Specifically, the terminal shoots an original video by using an application (for example, a camera application). During shooting, after receiving the sticker information and the description file of the sticker information that are sent by the server based on the text information obtained by the server by means of matching, the terminal parses the sticker information and the description file of the sticker information by using the material analyzer, to obtain information such as the sticker information and the attribute thereof, and a superposition location and a superposition time point. Video synthesis is performed, by using a video synthesizer according to the feature coordinates, the information such as the superposition location and the superposition time point that are indicated by the description file of the sticker information, on the sticker information and the original video that is currently being shot, so that a video processing result including the sticker information is generated.

Fifth, the dynamic sticker is finally recorded into the video during video recording, and the video recording ends.

In the several embodiments provided in this application, it is understood that the disclosed device and method may be implemented in other manners. The described device embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in a same place, or may be distributed to many network units. Some or all of the units need to be selected according to actual requirements to implement the purpose of the solution of the embodiments.

In addition, functional units in the embodiments of this application may be all integrated in a second processing unit, each unit is separately used as a unit, or two or more units are integrated in a unit. The integrated unit may be implemented in a form of hardware, or may be implemented in form of hardware plus a software functional unit.

A person of ordinary skill in the art may understand that, some or all of steps for implementing the method embodiments may be implemented by using hardware related to a program instruction. The program may be stored in a non-transitory computer readable storage medium. When the program is executed, the steps including the method embodiments are performed. However, the storage medium includes various types of media that may store program code, for example, a mobile storage device, a read-only memory (ROM), a random access memory (RAM), a magnetic disk, or an optical disk.

Alternatively, in this application, if implemented in the form of software functional modules and sold or used as independent products, the integrated modules may be stored in a computer-readable storage medium. Based on such an understanding, the technical solutions of the embodiments of this application essentially, or the part contributing to the prior art may be implemented in a form of a software product. The computer software product is stored in a storage medium and includes several instructions for instructing a computer device (which may be a PC, a server, a network device, or the like) to perform all or some of the methods described in the embodiments of this application. The foregoing storage medium includes: any media that can store program code, such as a removable storage device, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An information processing method, comprising:
receiving, by circuitry of a terminal, a first operation to trigger capture of first media information of a video of a user;
detecting at least one of a facial expression change of the user based on a first preset condition or a gesture of the user captured in the video based on a second preset condition during the capture of the first media information of the user;
sending, by the circuitry of the terminal, the detected at least one of the facial expression change or the gesture of the user to a server as key information;
receiving, by the circuitry of the terminal, second media information from the server in response to the key information, the second media information being determined by the server to correspond to the key information and selected by the server to be synthesized with the first media information; and
performing video synthesis on the first media information and the second media information such that the second media information is displayed with the first media information in association with the detected at least one of the facial expression change of the user or the gesture of the user.

2. The method according to claim 1, further comprising:
detecting text information during the capture of the first media information, wherein the key information sent to the server by the terminal includes the detected text information.

3. The method according to claim 2, wherein before the performing the video synthesis on the first media information and the second media information, the method further comprises:
receiving, by the terminal, a description file of the second media information that corresponds to the key information and that is received from the server.

4. The method according to claim 2, wherein the second media information includes at least one of the following:
first-type sticker information triggered by the at least one of the facial expression change of the user or the gesture of the user for displaying; and
second-type sticker information triggered by the text information for displaying.

5. The method according to claim 3, wherein the description file includes a location of the second media information relative to the first media information, and a display time of the second media information.

6. The method according to claim 5, wherein
the performing the video synthesis on the first media information and the second media information includes performing the video synthesis on the first media information and the second media information according to the description file, and
the second media information is displayed within the display time specified by the description file at the location that is specified by the description file.

7. The method according to claim 4, wherein when the second media information is the first-type sticker information, the performing the video synthesis on the first media information and the second media information comprises:
determining an initial coordinate of a feature and a target coordinate of the feature of the at least one of the facial expression change of the user or the gesture of the user;
determining, according to a location point positioned by using the target coordinate of the feature or a location area determined from the initial coordinate of the feature to the target coordinate of the feature, a location on which the first-type sticker information is to be superposed;
parsing a description file of the received first-type sticker information to obtain a display time of the first-type sticker information; and
performing the video synthesis on the first-type sticker information and the first media information according to the determined location and the obtained display time of the first-type sticker information.

8. The method according to claim 4, wherein when the second media information is the second-type sticker information, the performing the video synthesis on the first media information and the second media information comprises:
parsing a description file of the received second-type sticker information to obtain a location of the second-type sticker information relative to the first media information and a display time of the second-type sticker information; and
performing the video synthesis on the second-type sticker information and the first media information according to the obtained location and the display time.

9. A terminal, comprising:
circuitry configured to
receive a first operation to trigger capture of first media information of a video of a user;
detect at least one of a facial expression change of the user based on a first preset condition or a gesture of the user captured in the video based on a second preset condition during the capture of the first media information of the user;
send the detected at least one of the facial expression change or the gesture of the user to a server as key information;
receive second media information from the server in response to the key information, the second media information being determined by the server to correspond to the key information and selected by the server to be synthesized with the first media information; and
perform video synthesis on the first media information and the second media information such that the second media information is displayed with the first media information in association with the detected at least one of the facial expression change of the user or the gesture of the user.

10. The terminal according to claim 9, wherein
the circuitry is further configured to detect text information during the capture of the first media information, and
the key information sent to the server by the terminal includes the detected text information.

11. The terminal according to claim 10, wherein the circuitry is further configured to receive a description file of the second media information that corresponds to the key information and that is received from the server.

12. The terminal according to claim 10, wherein the second media information includes at least one of the following:
first-type sticker information triggered by the at least one of the facial expression change or the gesture of the user for displaying; and
second-type sticker information triggered by the text information for displaying.

13. The terminal according to claim 11, wherein the description file includes a location of the second media information relative to the first media information, and a display time of the second media information.

14. The terminal according to claim 13, wherein the circuitry is further configured to:
perform the video synthesis on the first media information and the second media information according to the description file; and
display, within the display time specified by the description file, the second media information at the location that is specified by the description file.

15. The terminal according to claim 12, wherein when the second media information is the first-type sticker information, the circuitry is further configured to
determine an initial coordinate of a feature and a target coordinate of the feature of the at least one of the facial expression change of the user or the gesture of the user;
determine, according to a location point positioned by using the target coordinate of the feature or a location area determined from the initial coordinate of the feature to the target coordinate of the feature, a location on which the first-type sticker information is to be superposed;
parse a description file of the received first-type sticker information to obtain a display time of the first-type sticker information; and
perform the video synthesis on the first-type sticker information and the first media information according to the determined location and the obtained display time of the first-type sticker information.

16. The terminal according to claim 12, wherein when the second media information is the second-type sticker information, the circuitry is further configured to
parse a description file of the received second-type sticker information to obtain a location of the second-type sticker information relative to the first media information, and a display time of the second-type sticker information; and
perform the video synthesis on the second-type sticker information and the first media information according to the obtained location and the display time.

17. A non-transitory computer-readable medium storing a program executable by a processor to perform:
receiving a first operation to trigger capture of first media information of a video of a user;
detecting at least one of a facial expression change of the user based on a first preset condition or a gesture of the user captured in the video based on a second preset condition during the capture of the first media information of the user;
sending the detected at least one of the facial expression change or the gesture of the user to a server as key information;
receiving second media information from the server in response to the key information, the second media information being determined by the server to correspond to the key information and selected by the server to be synthesized with the first media information; and
performing video synthesis on the first media information and the second media information such that the second media information is displayed with the first media information in association with the detected at least one of the facial expression change of the user or the gesture of the user.

18. The non-transitory computer-readable medium according to claim 17, further comprising:
detecting text information during the capture of the first media information, wherein the key information sent to the server includes the detected text information.

19. The non-transitory computer-readable medium according to claim 18, further comprising:
receiving a description file of the second media information that corresponds to the key information and that is received from the server.

20. The non-transitory computer-readable medium according to claim 19, wherein the description file includes a location of the second media information relative to the first media information, and a display time of the second media information.

* * * * *